United States Patent
Frolov et al.

(10) Patent No.: US 10,538,435 B2
(45) Date of Patent: Jan. 21, 2020

(54) SOLAR DESALINATION SYSTEM EMPLOYING A HUMIDIFICATION-DEHUMIDIFICATION PROCESS

(71) Applicant: SUNLIGHT AEROSPACE INC., Edison, NJ (US)

(72) Inventors: Sergey Frolov, Murray Hill, NJ (US); Michael Cyrus, Castle Rock, CO (US); Allan James Bruce, Scotch Plains, NJ (US)

(73) Assignee: Sunlight Aerospace Inc., Edison, NJ (US)

( * ) Notice: Subject to any disclaimer, the term of this patent is extended or adjusted under 35 U.S.C. 154(b) by 0 days.

(21) Appl. No.: 15/830,446

(22) Filed: Dec. 4, 2017

(65) Prior Publication Data
US 2018/0155210 A1 Jun. 7, 2018

Related U.S. Application Data

(63) Continuation of application No. 14/711,325, filed on May 13, 2015, now Pat. No. 9,834,455, which is a (Continued)

(51) Int. Cl.
*C02F 1/14* (2006.01)
*B01D 1/00* (2006.01)
(Continued)

(52) U.S. Cl.
CPC .............. *C02F 1/14* (2013.01); *B01D 1/0047* (2013.01); *B01D 1/14* (2013.01); *B01D 3/007* (2013.01);
(Continued)

(58) Field of Classification Search
CPC ....... C02F 1/14; B01D 1/0005; B01D 1/0047; B01D 1/14; B01D 3/007; B01D 3/16; B01D 3/343
See application file for complete search history.

(56) References Cited

U.S. PATENT DOCUMENTS 2,379,519 A 7/1945 Hall
3,288,685 A 11/1966 Kemper
(Continued)

FOREIGN PATENT DOCUMENTS

| DE | 19620214 | 10/1996 |
| JP | 2008020125 | 1/2008 |
| WO | 2010029723 | 3/2010 |

OTHER PUBLICATIONS

Mathioulakis et al. "Desalination by using alternative energy: Review and state-of the art" Mar. 15, 2006, pp. 345-365.
(Continued)

*Primary Examiner* — Jonathan Miller
(74) *Attorney, Agent, or Firm* — Mayer & Williams, PC; Stuart H. Mayer

(57) ABSTRACT

A hydro-thermal exchange unit (HTEU) for desalinating feed water in accordance with a humidification-dehumidification includes feed water, fresh water and gas conduit circuits for transporting feed water, fresh water, and gas, respectively. The unit also includes an evaporator through which a portion of the feed water conduit and the gas conduit pass. The evaporator causes evaporation of a portion of the feed water to produce vapor that is transported through the gas conduit. The unit also includes a condenser through which a portion of the gas conduit and the fresh water conduit pass. The condenser has input and output ports for coupling the gas and fresh water conduit circuits. The condenser extracts moisture from the vapor transported therethrough by the gas conduit. The extracted moisture is
(Continued)

discharged through the fresh water conduit. The unit also includes a heat exchanger through which a portion of the fresh water conduit and the feed water conduit pass to thereby extract residual heat from the fresh water such that the residual heat heats the feed water.

22 Claims, 23 Drawing Sheets

Related U.S. Application Data continuation of application No. 13/693,932, filed on Dec. 4, 2012, now Pat. No. 9,834,454, which is a continuation of application No. 12/770,892, filed on Apr. 30, 2010, now abandoned.

(51) Int. Cl.

| | | |
|---|---|---|
| *B01D 1/14* | (2006.01) | |
| *B01D 3/16* | (2006.01) | |
| *B01D 3/34* | (2006.01) | |
| *B01D 5/00* | (2006.01) | |
| *B01D 3/00* | (2006.01) | |
| *C02F 103/08* | (2006.01) | |

(52) U.S. Cl.
CPC ............ *B01D 3/16* (2013.01); *B01D 3/343* (2013.01); *B01D 5/0027* (2013.01); *C02F 2103/08* (2013.01); *Y02W 10/37* (2015.05)

(56) References Cited

U.S. PATENT DOCUMENTS

| | | | |
|---|---|---|---|
| 3,345,272 A | 10/1967 | Collins | |
| 4,194,949 A | 3/1980 | Stark | |
| 5,096,543 A | 3/1992 | Elmore | |
| 5,290,403 A | 3/1994 | Saask | |
| 5,520,858 A * | 5/1996 | Yamaguchi | ......... B01D 1/0076 |
| | | | 261/122.1 |
| 5,968,321 A | 10/1999 | Sears | |
| 6,919,000 B2 * | 7/2005 | Klausner | .................. C02F 1/04 |
| | | | 203/10 |
| 7,251,944 B2 | 8/2007 | Holtzapple | |
| 7,431,805 B2 | 10/2008 | Beckman | |
| 7,465,376 B2 | 12/2008 | Neubert | |
| 7,799,178 B2 | 9/2010 | Eddington | |
| 7,827,814 B2 | 11/2010 | Slater | |
| 8,277,614 B2 | 10/2012 | Alhazmy | |
| 8,292,272 B2 | 10/2012 | Elsharqawy | |
| 9,834,454 B2 * | 12/2017 | Frolov | ................ B01D 1/0047 |
| 9,834,455 B2 * | 12/2017 | Frolov | ................ B01D 1/0047 |
| 10,143,935 B2 * | 12/2018 | Govindan | ............. B01D 5/006 |
| 10,143,936 B2 * | 12/2018 | Govindan | ............. B01D 5/006 |
| 2004/0219400 A1 | 11/2004 | Al-Hallaj | |
| 2005/0230238 A1 | 10/2005 | Klausner | |
| 2008/0083605 A1 | 4/2008 | Holtzapple | |
| 2008/0164135 A1 * | 7/2008 | Slook | ................... B01D 1/0035 |
| | | | 202/83 |
| 2009/0314926 A1 | 12/2009 | Hinderling | |
| 2013/0168224 A1 * | 7/2013 | Godshall | .............. B01D 1/0035 |
| | | | 203/10 |
| 2014/0374347 A1 * | 12/2014 | Schneider | ................ C02F 3/02 |
| | | | 210/629 |

OTHER PUBLICATIONS

Al-Hallaj et al., Solar desalination with a humidification-dehumidification cycle: performance of the unit, Desalination 120 (1998) 273-280.

El-Dessouky et al., Multiple-effect evaporation desalination systems: thermal analysis, Desalination 125 (1999) 259-276.

Klausner et al., Evaporative heat and mass transfer for the diffusion driven desalination process, Heat Mass Transfer '2006) 42: 528-536_.

Bourouni et al., Water desalination by Humidification and dehumidification of air: state of the art, Desalination, 137:167-176, 2001_.

El-Dessouky et al., "Fundamentals of Salt Water Desalination" Chapter 3, 2002.

* cited by examiner

2400

SOLAR DESALINATION SYSTEM EMPLOYING A HUMIDIFICATION-DEHUMIDIFICATION PROCESS

CROSS REFERENCE TO RELATED APPLICATION

This application is a continuation of U.S. patent application Ser. No. 14/711,325, filed May 13, 2015, which is a continuation of U.S. patent application Ser. No. 13/693,932, filed Dec. 4, 2012 entitled "HYBRID SOLAR DESALINATION SYSTEM", which is a continuation of U.S. Ser. No. 12/770,892, filed Apr. 10, 2010, entitled "HYBRID SOLAR DESALINATION SYSTEM", now abandoned. The subject matter of both applications are incorporated herein by reference.

FIELD OF THE INVENTION

The present invention relates generally to a method and apparatus for water desalination using renewable solar energy.

BACKGROUND OF THE INVENTION

Fresh water has become a very valuable and scarce resource in recent years not only in arid countries of the Middle East and North Africa regions, but also in many highly populated areas of more developed countries, such as Spain, USA, China and many others. Increases in population and commercial activities have contributed to the depletion of freshwater resources. Desalination, as one of the earliest forms of water production, remains a popular method of water production throughout the world. Desalination typically uses a large amount of energy to remove a portion of pure water from a salt water source. Salt water (feed water) is fed into the process, the result of which is one output stream of pure (fresh) water and another stream of waste water with high salt concentration (brine). Large commercial desalination plants based on fossil fuels are in use by oil-rich countries to supplement their traditional sources of water supply. However, people in many other areas of the world have neither the money nor oil resources to allow them to produce water in a similar manner. Over a billion people today lack access to purified drinking water and the vast majority of these people live in rural areas, where it is very difficult to implement any traditional clean water solution. Difficulties related to the use of fossil fuels could be resolved by switching to renewable resources, such as solar, wind or geothermal energy. Geographical areas where water is needed are in fact rich with renewable energy sources. Thus the obvious way forward is to combine those renewable energy sources with desalination plants. Among various renewable energy resources, the solar energy stands out as the most available, convenient and appropriate energy source for desalination.

The main drawback with the use of solar energy in existing large-scale desalination plants is the resulting low productivity rate and thermal efficiency. However, since solar desalination plants use free energy and therefore have insignificant operational costs, over the long term they are more attractive than conventional approaches. This technology is still suitable even today for small-scale production, especially in remote arid areas and islands, where there is no supply of conventional energy. In addition to cost considerations, there are also environmental concerns about the fossil fuel burning. The coupling of renewable energy sources with desalination processes offers a sustainable, environmentally conscious route for increasing supplies of potable water.

Solar energy can be harnessed for desalination either directly or indirectly. Collection systems, which use solar energy to produce distillate directly in the solar collector, are called direct collection systems, whereas systems that combine solar energy collection systems with conventional desalination systems are called indirect systems. In indirect systems, solar energy is used to either generate the heat required for desalination or generate electricity subsequently used to provide electric power for conventional desalination plants such as multi-effect, multi-stage flash or reverse osmosis systems. Direct solar desalination is primarily suited for very small production systems, such as solar stills. The low production rate is caused by a low operating temperature and near atmospheric pressure of a resulting steam. Numerous attempts have been made in order to produce fresh water by means of solar energy. A simple solar still of a basin type is the oldest method. A solar still is a simple device that can be used to convert saline or brackish water into drinking water. Solar stills use exactly the same processes, which in nature generate rainfall, namely evaporation and condensation: a transparent cover encloses a pan of saline water that is first evaporated by the trapped solar energy within the enclosure and then condensed on the inner face of the sloping transparent cover. This distilled water is generally potable; the quality of the distillate is very high because all the salts, inorganic and organic components, and microbes are left behind in the bath. One of the problems that negatively influence the still performance is the direct contact between the collector and the saline water, which may lead to corrosion and scaling in the still. The biggest issue for the solar stills however are their rather low efficiency and water production rate: a typical production rate of a solar still is about 4 $L/m^2/day$ or less.

SUMMARY OF THE INVENTION

In accordance with one aspect of the present invention, a hydro-thermal exchange unit (HTEU) for desalinating feed water in accordance with a humidification-dehumidification process is provided. The hydro-thermal exchange unit includes feed water, fresh water and gas conduit circuits for transporting feed water, fresh water, and gas, respectively. The unit also includes an evaporator through which a portion of the feed water conduit and the gas conduit pass. The evaporator causes evaporation of a portion of the feed water to produce vapor that is transported through the gas conduit. The unit also includes a condenser through which a portion of the gas conduit and the fresh water conduit pass. The condenser has input and output ports for coupling the gas and fresh water conduit circuits. The condenser extracts moisture from the vapor transported therethrough by the gas conduit. The extracted moisture is discharged through the fresh water conduit. The unit also includes a heat exchanger through which a portion of the fresh water conduit and the feed water conduit pass to thereby extract residual heat from the fresh water such that the residual heat heats the feed water.

In accordance with another aspect of the invention, a hydro-thermal section (HTS) is provided. The HTS includes a hydro-thermal exchange unit for desalinating feed water in accordance with a humidification-dehumidification process. The hydro-thermal exchange unit includes feed water, fresh water and gas conduit circuits for transporting feed water, fresh water, and gas, respectively. The hydro-thermal exchange unit also includes an evaporator through which a portion of the feed water conduit and the gas conduit pass. The evaporator causes evaporation of a portion of the feed water to produce vapor that is transported through the gas conduit. The hydro-thermal exchange unit also includes a condenser through which a portion of the gas conduit and the fresh water conduit pass. The condenser extracts moisture from the vapor transported therethrough by the gas conduit. The extracted moisture is discharged through the fresh water conduit. The HTS also includes a thermal energy source which provides thermal energy that causes the feed water to be heated.

In accordance with yet another aspect of the invention, an HTS includes a plurality of serially coupled hydro-thermal exchange units for desalinating feed water in accordance with a humidification-dehumidification process. The plurality of hydro-thermal exchange units includes an upstream-most hydro-thermal exchange unit and a downstream-most hydro-thermal exchange unit. Each of the hydro-thermal exchange units includes a feed water, fresh water and gas conduit circuit for transporting feed water, fresh water, and gas, respectively, an evaporator through which a portion of the feed water conduit and the gas conduit pass, and a condenser through which a portion of the gas conduit and the fresh water conduit pass. Each hydro-thermal exchange unit also includes a heat exchanger through which a portion of the fresh water conduit and the feed water conduit pass to thereby extract residual heat from the fresh water such that the residual heat heats the feed water. A feed water output conduit from a heat exchanger in an immediately preceding upstream hydro-thermal exchange unit is connected to a feed water input conduit to the evaporator of an immediately following downstream hydro-thermal exchange unit and a fresh water output conduit from the condenser of the upstream hydro-thermal exchange unit is connected to a fresh water input conduit to the heat exchanger of the immediately preceding upstream hydro-thermal exchange unit. The HTS also includes a solar collector array for capturing solar energy that at least in part causes evaporation of a portion of the feed water received from the downstream-most hydro-thermal exchange unit. The solar collector array has a feed water output conduit connected to an input feed water conduit of the evaporator of the upstream-most hydro-thermal exchange unit.

In accordance with another aspect of the invention, a solar-powered desalination system includes a desalination module. The desalination module includes an electro-mechanical section (EMS) that includes a photovoltaic module for converting solar energy to electrical energy and at least one pump powered by the electrical energy. The desalination module also includes a hydro-thermal section (HTS) for desalinating feed water in accordance with a humidification-dehumidification process. The hydro-thermal section includes a solar collector for capturing solar energy that at least in part causes evaporation of a portion of the feed water. The at least one pump is configured to pump water through the hydro-thermal section.

In accordance with another aspect of the invention, a method is provided for desalinating feed water. The method includes capturing solar energy, pumping feed water through a hydro-thermal exchange unit using electrical energy obtained in a photovoltaic conversion process, and desalinating feed water in the hydro-thermal exchange unit in accordance with a humidification-dehumidification process by using the captured solar energy to evaporate a portion of the feed water that is subsequently condensed to thereby obtain desalinated feed water.

In accordance with another aspect of the invention, a method is provided for incrementally expanding an existing desalination system. The method includes providing a HTS for desalinating feed water in accordance with a humidification-dehumidification process. The HTS includes feed water, fresh water and gas conduit circuits for transporting feed water, fresh water, and gas, respectively and a thermal energy source which provides thermal energy that causes the feed water to be heated. The HTS also includes an evaporator through which a portion the feed water conduit and the gas conduit pass. The evaporator causes evaporation of a portion of the feed water to produce vapor that is transported through the gas conduit. The HTS further includes a condenser through which a portion of the gas conduit and the fresh water conduit pass. The condenser extracts moisture from the vapor transported therethrough by the gas conduit. The extracted moisture is discharged through the fresh water conduit. A common feed water supply conduit is coupled to an input conduit of the feed water conduit circuit of the HTS and an input conduit of a feed water conduit circuit of the existing desalination system. A common fresh water discharge conduit is coupled to an output conduit of the fresh water conduit circuit of the HTS and an output conduit of a fresh water conduit circuit of the existing desalination system.

DETAILED DESCRIPTION

Figure 1:
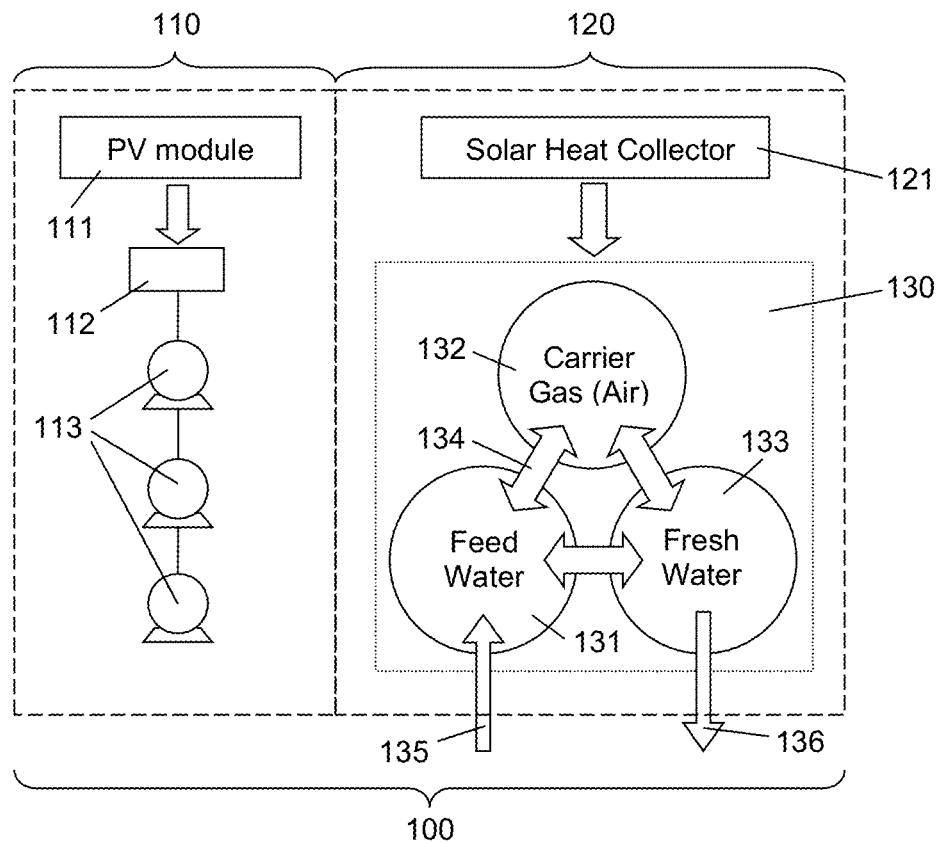
FIG. 1 shows one example of a desalination system that includes an electro-mechanical section (EMS) and hydro-thermal section (HTS).

In the following detailed description, numerous specific details are set forth in order to provide a thorough understanding of exemplary embodiments or other examples described herein. However, it will be understood that these embodiments and examples may be practiced without the specific details. In other instances, well-known methods, procedures, components and circuits have not been described in detail, so as not to obscure the following description. Further, the embodiments disclosed are for exemplary purposes only and other embodiments may be employed in lieu of, or in combination with, the embodiments disclosed.

The operation of a solar still is based on a humidification-dehumidification (HD) cycle, in which air is first humidified by evaporation of feed water and subsequently dehumidified to produce fresh water as a result. Air can be mixed with significant quantities of vapor. The vapor carrying capability of air increases with temperature, i.e. 1 kg of dry air can carry 0.6 kg of vapor when its temperature increases to 80° C. A significant advantage of this type of technology is that it provides means for low pressure and low temperature desalination. It can operate off the solar heat, which is not only environmentally safe and, but also economically attractive. HD-based desalination systems could potentially be very cost competitive. However, so far these systems have not been able to compete successfully against existing, more common approaches, such as reverse osmosis or multi-effect evaporation. The main reasons are a relatively low efficiency and high capital costs associated with the solar-driven HD systems. There is a need to design and develop more advanced solar-driven desalination approaches, which can be easily and effectively implemented in a wide range of production capacities at different locations around the world.

In the following discussion the HD process is described as it specifically applies to the desalination of saline or brackish feed water. However, the same method and apparatus can be used in other application of this process, e.g. water purification, distillation and others. The described apparatus can be also used in processing of liquids and materials other than water, e.g. alcohols, acids, foodstuffs, etc.

In accordance with the present invention, a desalination system driven primarily by solar energy is provided. The system 100 shown in FIG. 1 consists of at least two integrated parts: electro-mechanical section (EMS) 110 and hydro-thermal section (HTS) 120. EMS 110 comprises at least one PV cell or PV module 111, which is used to provide electrical power to other EMS components, such as a system controller 112, water and air pumps 113, and other possible electro-mechanical components. HTS 120 comprises at least one solar thermal collector 121 and hydro-thermal exchange unit 130 (HTEU). Unit 130 in turn comprises three independent circulation conduits or circuits: (1) circuit 131 for transporting feed water, (2) circuit 132 for transporting vapor carrying gas (typically air), and (3) circuit 133 for circulating fresh water. The circuits may comprise pipes, tubes, ducts, valves, taps, splitters, regulators and other components involved in water and air circulation. These circuits could be fully open, partially open or closed circuits. Means for heat and mass transfer 134 between respective circuits are also provided and described in detail below. Heat collected by collector 121 is transferred to at least one of the circuits 131, 132 and 133. Also, means for supplying feed water 135 and discharging fresh water 136 are provided. As a result, system 100 is an autonomous desalination system, which can extract all of the energy required for its operation from ambient solar energy (or alternatively from other renewable energy sources). This desalination system represents a hybrid approach to desalination, encompassing attractive features of both direct and indirect desalination methods. For example, the solar heat is collected in the integrated collector 121, which is characteristic of the direct desalination. However, heat/mass exchange and fresh water extraction are accomplished in the exchange unit 130 physically remote from the collector, which is characteristic of indirect desalination enabling better heat recovery and efficiency.

Figure 2:
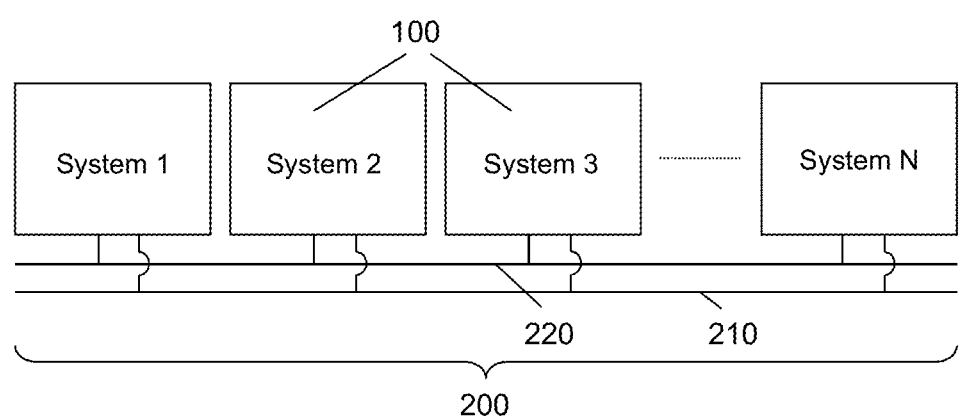
FIG. 2 shows an alternative example of a desalination system that is modular.

A larger desalination system 200 shown in FIG. 2 may be built using a modular design approach. In this case system 200 consists of several smaller, independent systems 100 connected to common feed water supply and fresh water discharge lines 210 and 220, respectively. Such an approach simplifies the design of large desalination systems, minimizes component costs and lowers the start-up capital cost.

Desalination systems may be modified to include other sources of energy. For example, electrical power at least in part may be provided to the system from an electrical utility grid, an electrical power generator or any other independent electrical supply. Furthermore, other heat sources may be used for feed water heating, e.g. geothermal heat, industrial waste heat or others.

Figure 3:
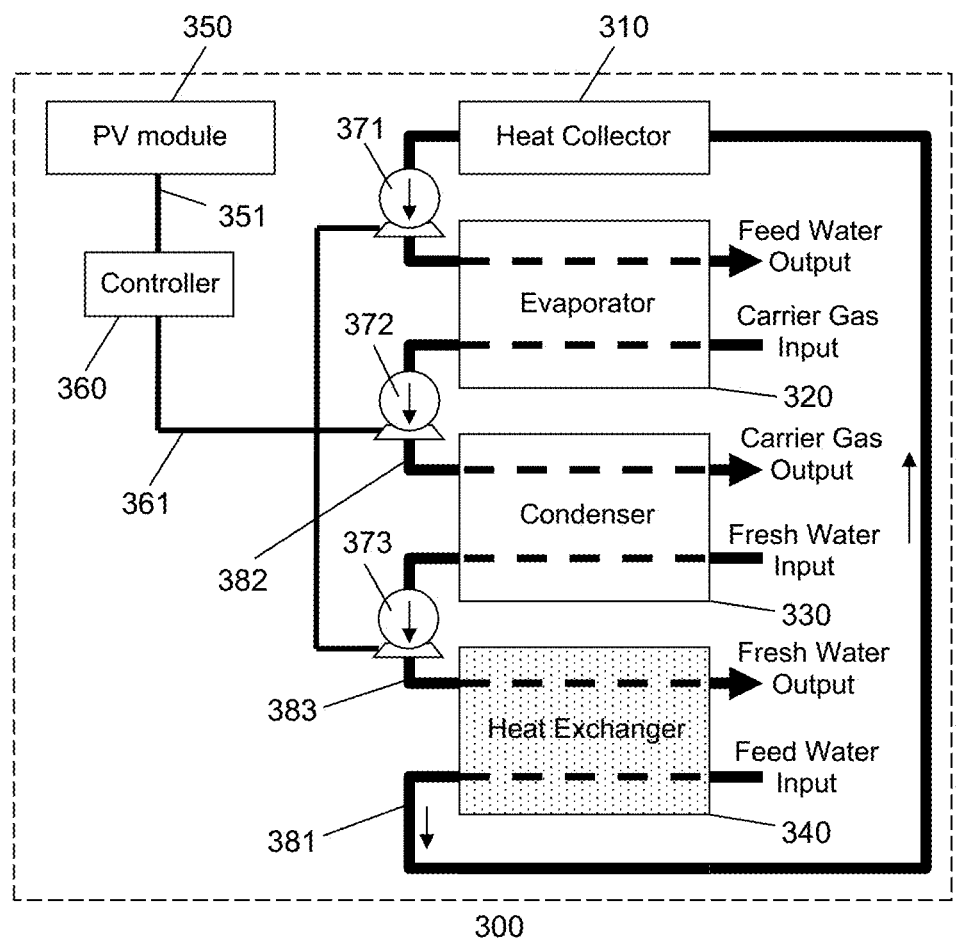
FIGS. 3-5 show other examples of a desalination system.

In accordance with the present invention, an advanced hybrid desalination system may be provided as shown in FIG. 3. System 300 comprises an HTS, which includes at least solar heat collector 310, evaporator 320, condenser 330, and heat exchanger 340, and an EMS, which includes at least PV module 350, controller 360 and pumps 371-373. Feed water is circulated using pump 371 and pipe circuit 381 in the direction indicated by the arrows in FIG. 3. The feed water is heated in the solar collector 310 and then partly evaporated by the evaporator 320. The vapor is carried away by the carrier gas, such as air, in an air duct circuit 382. The carrier gas is driven by air pump 372. The moisture is then extracted in the condenser 330 and discharged using fresh water circuit 383 and pump 373. Latent heat recovered in the condenser is used to pre-heat feed water in the heat exchanger 340. PV panel 350 provides electrical power to the system using electrical circuit 351. Controller 360 manages power distribution among the pumps using electrical circuit 361.

Some or all of the aforementioned circuits 381-383 may be partially or fully closed as shown below. For example, the air circuit 382 may be a fully closed loop, so that the same air is recycled in sequential humidification-dehumidification cycles. The fresh water circuit 383 may be a partially closed loop, in which a portion of the flow is returned back to the system and the other portion is discharged. Similarly, the feed water circuit may be partially closed, so that a portion of feed water cycled back into the system.

Other components may be included in the desalination systems described above, such as backup batteries, solar heat storage, water filtering components etc. Electrical batteries and solar heat storage can store excess solar energy during the day, so that the system may operate during the night. This approach extends the operation of the system and thus improves its utility. The solar heat storage may be a hot water tank. Alternatively, a higher boiling temperature liquid may be used such as oil. In this case, the oil is first heated in the heat collector and then transferred to a storage tank. The feed water can then be heated using the hot oil, rather than the direct solar heat exposure.

Figure 4:
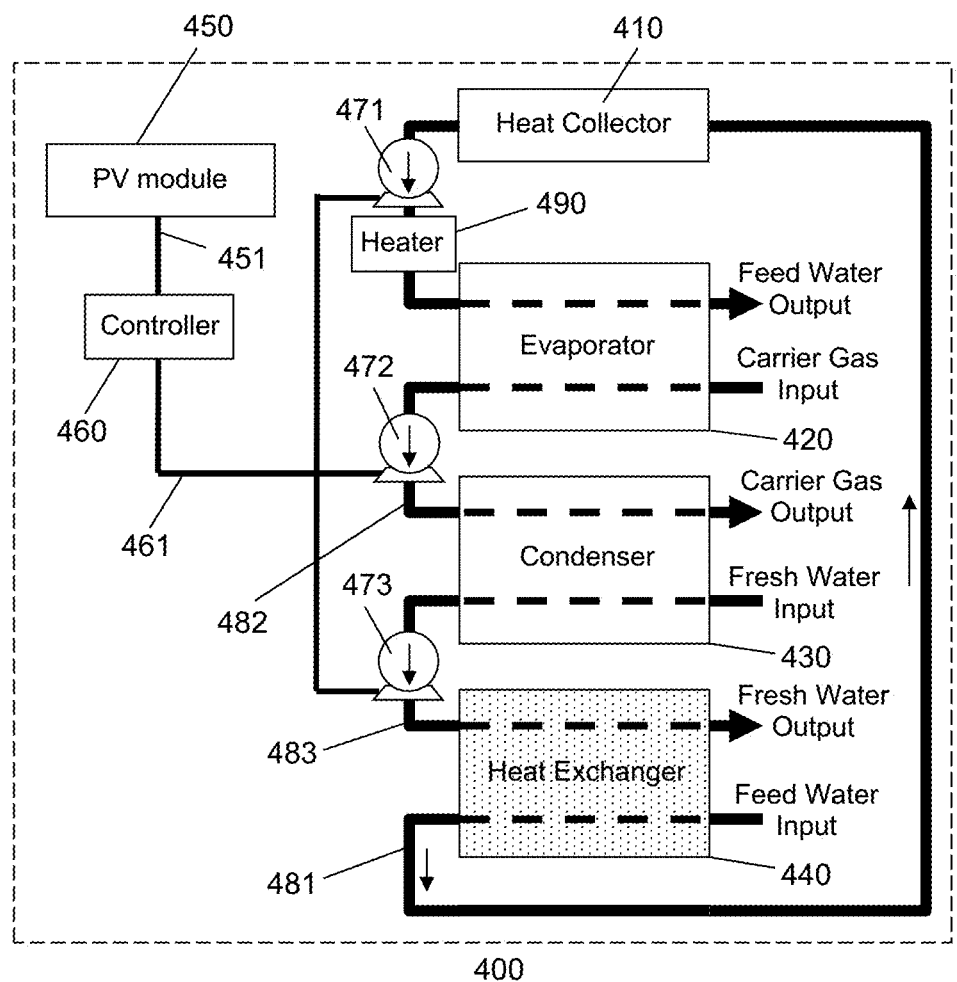

This system may be modified to improve its performance according to FIG. 4. System 400 in this case, in addition to solar heat collector 410, evaporator 420, condenser 430, and heat exchanger 440, has post-heater 490. The PV panel 450 then provides electrical power not only to controller 460 and pumps 471-473, but also to the heater 490. The operation of the system 400 is similar to that of the system 300 in all respects, except that the additional electrical heater 490 raises the maximum temperature of the feed water as it enters the evaporator 420. The extra temperature rise increases the air moisture content and evaporator efficiency. Also, the location and layout of the pumps may be different from the ones shown in FIGS. 3 and 4.

Figure 5:
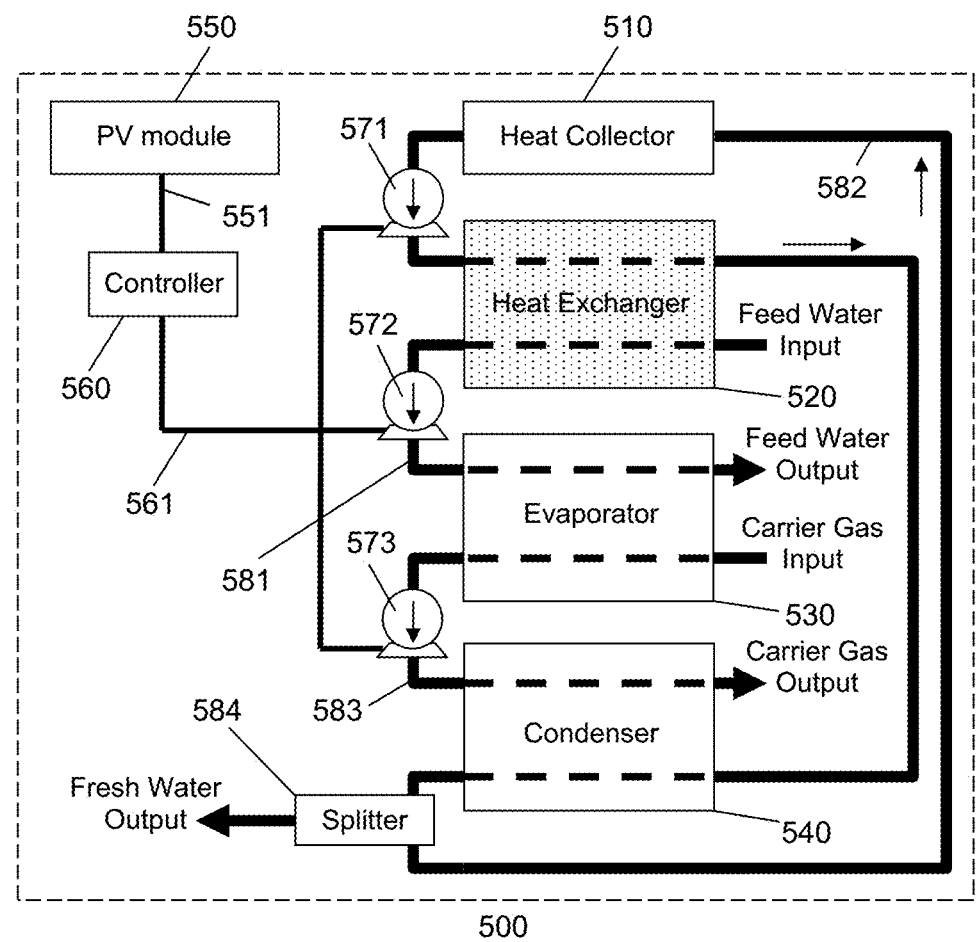

In accordance with the present invention, an alternative advanced hybrid desalination system may be provided as shown in FIG. 5. System 500 comprises an HTS, which includes at least solar heat collector 510, heat exchanger 520, evaporator 530 and condenser 540, and an EMS, which includes at least PV module 550, controller 560 and pumps 571-573. Feed water is circulated using pump 572 and pipe circuit 581, whereas fresh water is circulated using pump 571 and pipe circuit 582. The fresh water is heated in the solar collector 510 and then used to heat up the feed water in the heat exchanger 520. An additional electrical post-heater (not shown) may be used to further raise the temperature of the feed water before it enters the evaporator 530. The feed water is then partly evaporated and the vapor is carried away by the carrier gas, such as air, in an air duct circuit 583. The circulation of the carrier gas is driven by air pump 573. The moisture is extracted afterwards in the condenser 540 and added to the recirculating supply of fresh water in the fresh water circuit 582. Latent heat produced in the condenser is used to heat up the fresh water before it enters the solar collector 510. PV panel 550 provides electrical power to the system using electrical circuit 551. Controller 560 manages power distribution among the pumps using electrical circuit 561. Some or all of the aforementioned circuits 581-583 may be partially or fully closed as shown below. For example, the air circuit 583 may be a fully closed loop, so that the same air is recycled in sequential humidification-dehumidification cycles. The fresh water circuit 582 may be a partially closed loop, in which a portion of the flow is returned back to the system and the other portion is discharged using circuit 584. The feed water circuit may be open, so that the used feed water (brine) is completely discharged out of the system after passing once through the evaporator.

The fresh water circuit configured as a closed loop or a partially closed loop (e.g. circuit 582) does not require a special fresh water input for providing a continuous supply of additional fresh water. In this case the fresh water is primarily generated by the system itself through the process of dehumidification in the condenser. However, at the start of the desalination process the fresh water circuit may have to be filled with the amount of fresh water sufficient to run the condenser. Alternatively, in the absence of fresh water the fresh water circuit may be filled with the feed water. In the latter case the desalination system may have to be run for several hours before the water at the fresh water output is clean.

Desalination systems 300, 400 and 500 are specific design examples of system 100 shown in FIG. 1. Other designs of system 100 are of course possible. They include variations in the order of heat and mass exchanges among different elements and circuits of the HTS, additional elements in the HTS, such as heat exchangers, heaters, filters, etc., and additional elements in the EMS, such as alternative energy sources (wind or wave power generators). For example, heat from the solar collector may be transferred to the carrier gas. Sun tracking and concentrating optics may be added to improve solar energy conversion efficiency in the integrated PV modules and/or heat collectors. Any of these desalination systems may be based on the ground or water (e.g. coastal areas). In the latter case the EMS should be water resistant and the system as a whole should float on the water surface. As a single stage desalination system (i.e. a single humidification-dehumidification cycle), this system is intrinsically safe for the environment, since it produces very low salinity brine. Additional vertical positioning equipment may be included in such a system, which would allow the system to be submerged or raised above the water surface. In addition, the system may be provided with a small engine, motor, thruster or other, which would enable autonomous translation motion across the water surface. The autonomous positioning system may be used for system protection against inclement weather.

Different solar collectors may be used in order to convert solar energy to heat. Either fluid or gas is heated by the solar radiation as it circulates along the solar collector through or near an absorber. The heat may be transferred to the carrier gas, feed water or fresh water. Some other fluid may be also heated at the solar collector and either stored at an insulated tank or used to heat another thermal medium. The solar collector may be a static or suntracking device. The latter ones may have one or two axes of sun tracking. An example of a static collector is a flat-plate collector (FPC) made of either metal or plastic. The absorber pipes are assembled on a flat plate and they usually have a transparent protective surface in order to minimize heat losses. They may have different selective coatings to reduce heat losses and to increase radiation absorption. A typical flat-plate collector is an insulated metal box with a glass or plastic cover and a black absorber plate. The flow tubes can be routed in parallel or in a serpentine pattern. Flat plate collectors so far have not been found as a very popular and useful technology for desalination. Although they have been used for relatively small desalinated water production volumes, production of large volumes of water today requires additional energy sources. Heat losses could be minimized in evacuated tube collectors (ETCs) by an evacuated cover of the absorber. Evacuated tubes could be either Dewar-type coaxial glass tubes or ETC with a metallic absorber and a glass-to-metal seal. ETCs reach higher temperatures and efficiencies, and they are typically used in conjunction with the solar concentration.

Another energy-harvesting portion of system 100 is the PV module 111, which provides necessary electrical power to the electrical components of the system. There are different PV technologies suitable for this purpose. The most widespread technology is based on crystalline silicon, which provides PV modules with efficiency of about 14-18%. Higher efficiencies of about 25-30% can be achieved using multi junction PV modules based on another crystalline semiconductor—GaAs. When these modules are used in combination with solar concentration, energy conversion efficiencies approach and may even exceed 40%. However, PV modules based on these technologies tend to be expensive and in some cases may be even cost prohibitive for desalination purposes. Less expensive PV technologies exist and they are based on thin-film semiconductors, such as a-Si, CdTe, $CuInGaSe_2$ and others. Thin-film PV modules are somewhat less efficient than their crystalline silicon counterparts, but they may be more economical in desalination applications. Current developments in thin-film PV also suggest that the efficiency of these modules will eventually approach that of Si modules and their cost will continue to decrease substantially below that of Si modules, which would make thin-film PV even more attractive for desalination purposes.

Figure 6:
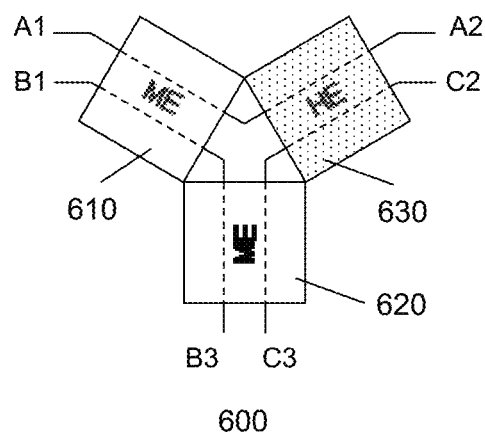
FIGS. 6-8 show various configurations of a hydro-thermal exchange unit (HTEU).
Figure 7:
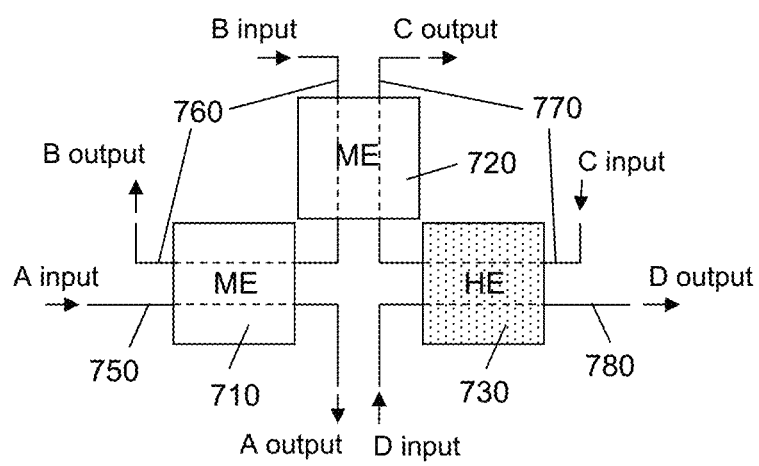

In accordance with the present invention, a hydro-thermal exchange unit (HTEU) can be configured in a closed star configuration, as shown in FIG. 6. Unit 600 comprises at least mass exchange units 610 and 620 and heat exchanger 630, which are directly connected to each other. The mass exchange units are the evaporator and condenser used respectively to humidify and dehumidify the carrier gas. The heat exchanger 630 is used to recover the latent heat released in the condenser. Alternatively, a hydro-thermal exchange unit can be configured in an open star configuration, as shown in FIG. 7. Unit 700 comprises at least mass exchange units 710 and 720 and heat exchanger 730, some of which are not directly connected (e.g. units 710 and 730). For example, mass exchange unit 710 may be an evaporator, in which feed water transferred via circuit 750 is partly evaporated and carried away by the carrier gas transferred by circuit 760. Respectively, mass exchange unit 720 may be a condenser, in which the moisture is extracted from the carrier gas, condensed and added to the flow of fresh water transferred by circuit 770. Subsequently, the heat exchanger 730 and the latent heat carried by the fresh water flowing from the condenser are used to heat up feed water carried by circuit 780. The arrows in FIG. 7 indicate the flow directions for all circuits in the example considered above. It should be noted that the open star configuration can only be depicted in the drawings in only one way as shown in FIG. 7, but the closed star configuration can be depicted in the manner shown in either FIG. 6 or FIG. 7. The main difference between these two configurations is that in the closed star arrangement each unit is internally connected, whereas in the open star arrangement this is not the case and there are additional ports (e.g. output A and input D as in FIG. 7).

Figure 8:
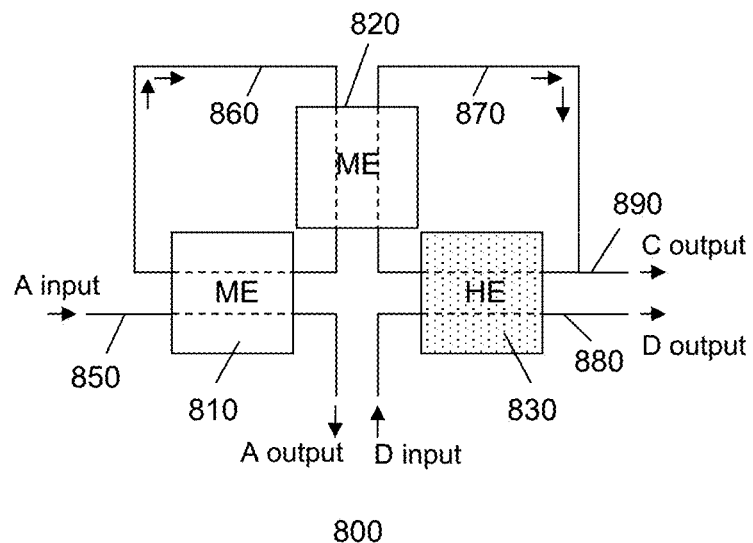

Similarly, a hydro-thermal exchange unit can be also configured in an open star configuration, as shown in FIG. 8. Unit 800 comprises at least mass exchange units 810 and 820 and heat exchanger 830. In this case mass exchange unit 810 may be an evaporator, in which the feed water transferred via circuit 850 is partly evaporated and carried away by the carrier gas transferred by circuit 860. Circuit 860 is configured in a closed loop configuration, so that the same carrier gas may be used repeatedly. Respectively, mass exchange unit 820 may be a condenser, in which the moisture is extracted from the carrier gas, condensed and added to the flow of fresh water transferred by circuit 870. Circuit 870 is configured in partially closed configuration, enabling fresh water recirculation. Excess fresh water is discharged using output circuit 890. The heat exchanger 830 is used to heat up feed water carried by circuit 880.

Figure 9:
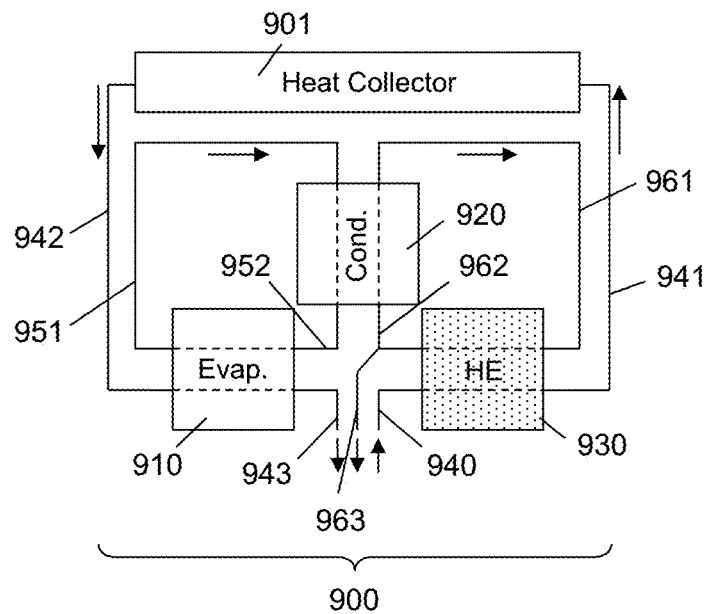
FIGS. 9-12 show various configurations of n hydro-thermal section (HTS).

Accordingly, the HTS of a desalination system may be configured in an open or closed star configuration. For example, FIG. 9 shows an HTS in an open star configuration comprising solar collector 901, evaporator 910, condenser 920 and heat exchanger 930. In this case, feed water is supplied to the system 900 via circuit 940 and preheated in the heat exchanger 930. It is further transferred to the collector 901 via circuit 941, where it is heated to its maximum temperature. The feed water is subsequently transferred to the evaporator 910 via circuit 942 and its remainder is discharged from the system via circuit 943. Evaporated moisture is carried by an air flow in circuit 951 from the evaporator 910 to the condenser 920, after which dehumidified air is recirculated back to the evaporator using circuit 952. Condensed moisture is added to the flow of fresh water and carried away by circuit 961. Fresh water is heated due to the release of latent heat in the condenser. This heat is used to pre-heat incoming feed water in the heat exchanger 930. Cooled fresh water is recirculated back to the condenser using circuit 962. A portion of the fresh water flow is split and excess is discharged via circuit 963. In this example the carrier gas circuit (951 and 952) is configured in the closed loop configuration. Although the air is used as a carrier gas, other gasses may be also used, such as argon, nitrogen, carbon dioxide and others. The fresh water circuit (961, 962 and 963) is configured in a partially closed configuration, and the feed water circuit (940, 941, 942 and 943) is configured in an open configuration. Mass and heat exchangers 910, 920 and 930 are preferably counter-flow exchangers, since counter-flowing optimizes the heat/mass exchange rate and maximizes the efficiency of an exchange process. The HTS 900 is designed to recover primarily the latent heat of the condensing water vapor, which is typically the primary source of heat losses in the solar-based direct desalination systems. However, the temperature of the discharged feed water (brine) carried by the circuit 943 is typically higher than that of the feed water at the intake in the circuit 940. The residual heat carried by the brine in this case is an additional source of heat losses.

Figure 10:
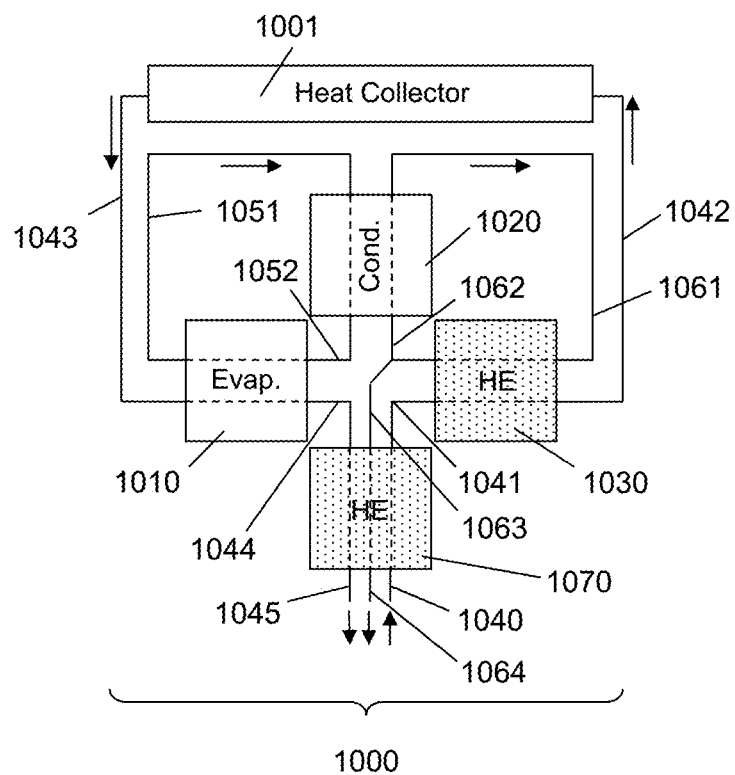

HTS 1000 shown in FIG. 10 recovers both the latent heat of the condensed fresh water and the residual heat of the discharged brine. HTS 1000 comprises solar collector 1001, evaporator 1010, condenser 1020, primary heat exchanger 1030 and secondary heat exchanger 1070. In this case, feed water is supplied to the HTS 1000 via circuit 1040 and preheated in the heat exchangers 1030 and 1040. It is further transferred to the collector 1001 via circuit 1042, where it is heated to its maximum temperature. The feed water is subsequently transferred to the evaporator 1010 via circuit 1043 and its remainder is discharged from the system via circuits 1044 and 1045. Evaporated moisture is carried by an air flow in circuit 1051 from the evaporator 1010 to the condenser 1020, after which the dehumidified air is recirculated back to the evaporator using circuit 1052. Although the carrier gas circuit in this example (1051 and 1052) is configured in the closed loop configuration, it may be configured in this and other cases as a partially closed or an open circuit as well. Condensed moisture is added to the flow of fresh water and carried away by circuit 1061. Fresh water flow is heated due to the release of latent heat in the condenser. This heat is used to pre-heat incoming feed water in the heat exchanger 1030. Cooled fresh water is recirculated back to the condenser using circuit 1062. Fresh water circuit 1062 is divided at this point and the excess fresh water is redirected via circuit 1063, while the rest is reused in the condenser 1020. The HTS 1000 is designed to recover not only the latent heat of the condensing water vapor, but also the residual heat carried by the brine. The secondary heat exchanger 1070 recovers additional heat from discharged brine (circuit 1045) and fresh water (circuit 1064), in order to pre-heat incoming feed water (circuit 1040). In this case the exchanger 1070 provides the heat exchange between the incoming cool feed water and a pair of warm outgoing flows of fresh water and brine. It is also preferable to provide counter-flow heat exchanger 1070 to optimize its efficiency, as shown in FIG. 10.

Figure 11:
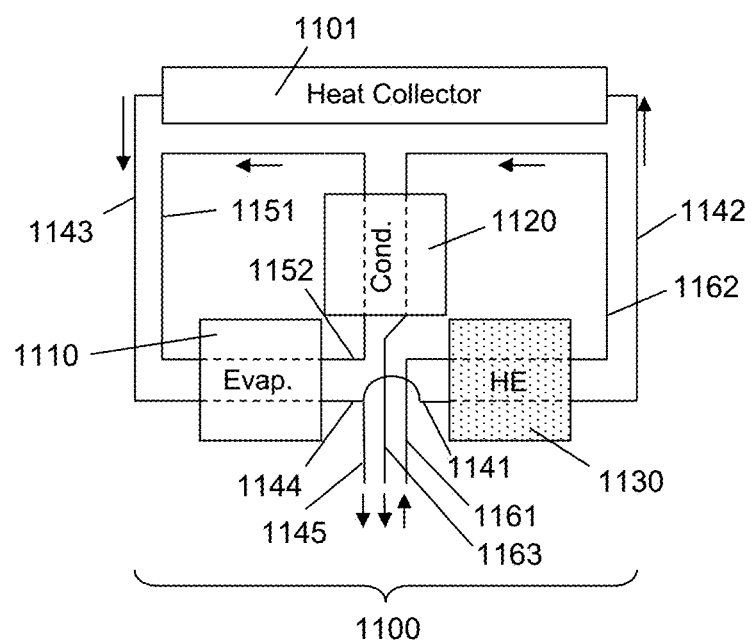

In accordance with the present invention, an HTS of a solar desalination system 100 may be also configured as shown in FIG. 11. HTS 1100 comprises solar collector 1101, evaporator 1120, condenser 1110, and heat exchanger 1130. In this case, feed water is supplied to the HTS 1100 via circuit 1161 and heated in the heat exchanger 1130. It is further transferred to the evaporator 1120 via circuit 1162 and its remainder is discharged from the system via circuit 1163. Evaporated moisture is carried by an air flow in circuit 1151 from the evaporator 1120 to the condenser 1110, after which the dehumidified air is recirculated back to the evaporator using circuit 1152. Condensed moisture is added to the flow of fresh water and carried away by circuit 1143. Fresh water flow is pre-heated due to the release of latent heat in the condenser and further heated in the solar collector 1101. Subsequently, heated freshwater in circuit 1142 is used to heat up the feed water in the heat exchanger 1130. Cooled fresh water is then recirculated back to the condenser 1110 using circuits 1141 and 1144. The excess fresh water is discharged using circuit 1145. This HTS design eliminates any direct contact between the solar collector and the feed water, thus avoiding some of the problems related to the corrosion induced by salty and polluted feed water. It also shortens the path of the feed water flow and thus minimizes corrosion in the HTS as a whole.

Figure 12:
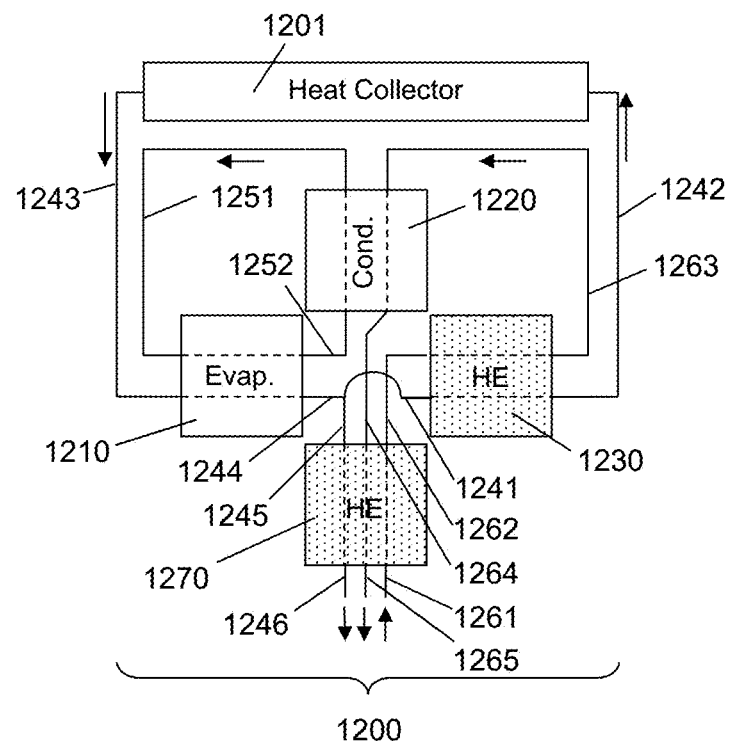

Furthermore, FIG. 12 shows another HTS design with additional capabilities. HTS 1200 comprises solar collector 1201, evaporator 1220, condenser 1210, primary heat exchanger 1230 and secondary heat exchanger 1270. Feed water is supplied to the HTS 1200 via circuit 1261 and pre-heated in the heat exchangers 1270 and 1230. It is further transferred to the evaporator 1220 via circuit 1263 and its remainder is discharged from the system via circuit 1265. Evaporated moisture is carried by an air flow in circuit 1251 from the evaporator 1220 to the condenser 1210, after which the dehumidified air is recirculated back to the evaporator using circuit 1252. Condensed moisture is added to the flow of fresh water and carried away by circuit 1243. Fresh water flow is pre-heated due to the release of latent heat in the condenser and further heated in the solar collector 1201. Subsequently, heated freshwater in circuit 1242 is used to heat up the feed water in the heat exchanger 1230. Cooled fresh water is then recirculated back to the condenser 1210 using circuits 1241 and 1244. The excess fresh water is redirected using circuit 1245. The secondary heat exchanger 1270 is used to recover residual heat from the outgoing flows of fresh water and brine (circuits 1245 and 1264, respectively). This design allows one to raise the average and maximum temperatures in the humidification process and thus increase its efficiency.

HTS apparatus shown in FIGS. 9-12 may be modified to include other heat sources for heating the feed water. For example, solar heat collectors may be replaced with geothermal heat collectors, high pressure steam heaters, industrial waste heat recovery collector and others.

Figure 13:
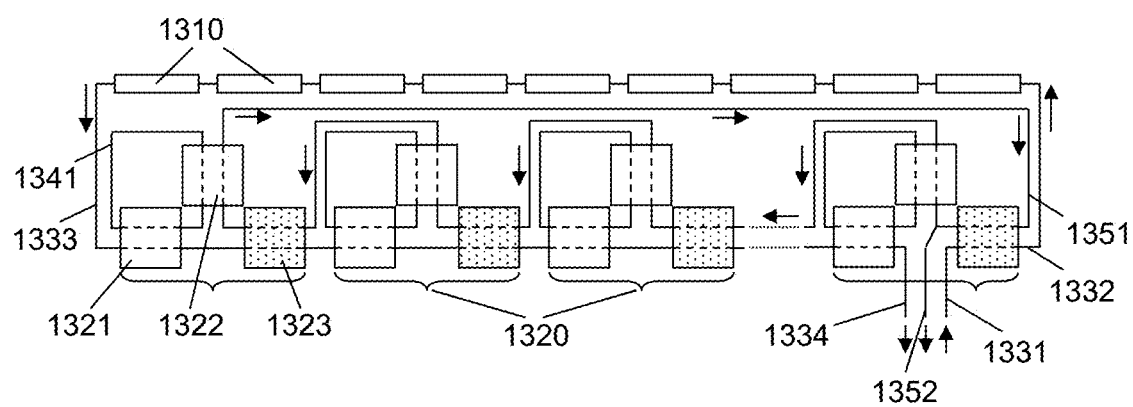
FIGS. 13-14 show two examples of a multi-stage HTS design.

In accordance with the present invention, several HTS may be linked together as shown in FIG. 13. System 1300 comprises several solar collectors 1310 (N number of solar collectors) and several hydro-thermal exchange units 1320 (M number of HTEUs). Each hydro-thermal exchange unit (HTEU) comprises at least an evaporator 1321, a condenser 1322 and a heat exchanger 1323. In this example all HTEUs, except the last one, are configured in the closed star configuration and connected to each other in series, in order to mimic the operation of a multi-effect desalination system, so that each HTEU represents a single stage in the full cycle and the whole desalination cycle contains M stages. Feed water is provided via input circuit 1331 and pre-heated in the heat exchanger of the last stage HTEU (the rightmost HTEU in FIG. 13). Circuit 1332 transfers the pre-heated feed water to the array of solar collectors 1310 connected to each other in series and/or in parallel, where it is further heated to its maximum temperature. The heated feed water is then transferred via circuit 1333 to the evaporator 1321 of the first stage HTEU (the leftmost HTEU in FIG. 13). The evaporated moisture is then carried by the carrier gas (air) using circuit 1341 to the condenser 1322, where it is extracted and added to the flow of fresh water in circuit 1351. After that the fresh water is transferred to the heat exchanger 1332 of the last stage HTEU. The feed water in the first stage, on the other hand, is first reheated in the heat exchanger 1323 and then transfer to the input of the second stage, i.e. the evaporator 1321 of the $2^{nd}$ stage. This cycle of evaporation, condensing and reheating is repeated at each stage until the last stage, after which the used feed water is discharged as the brine using circuit 1334. The flow of the fresh water is in the backward direction—from the M-th stage evaporator to the M-1 stage heat exchanger and so on until it reaches the $1^{st}$ stage evaporator and then circled back to the M-th stage heat exchanger. The excess fresh water can then be extracted using a splitter circuit 1352. This HTS design increases system capacity and overall efficiency.

Figure 14:
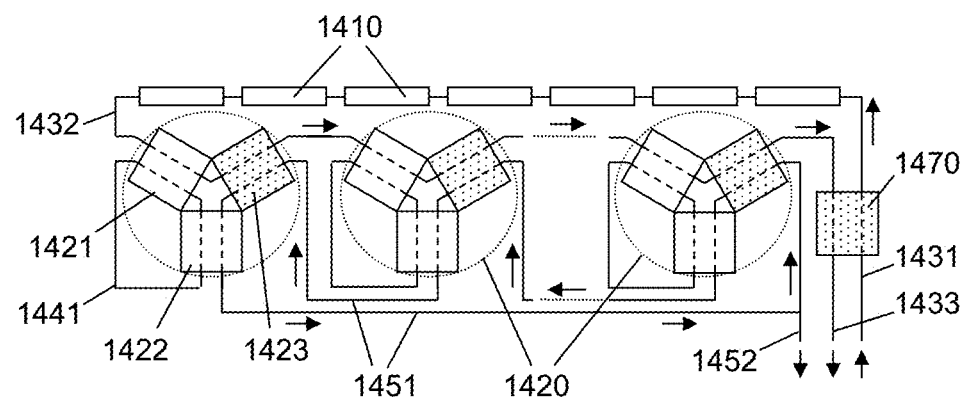

FIG. 14 shows another example of a multi-stage HTS design. System 1400 comprises several solar collectors 1410 (N number of solar collectors) and several hydro-thermal exchange units 1420 (M number of HTEUs). Each hydro-thermal exchange unit (HTEU) comprises at least an evaporator 1421, a condenser 1422 and a heat exchanger 1423. In this example all HTEUs are configured in the closed star configuration and connected to each other in series, in order to mimic the operation of a multi-effect desalination system, so that each HTEU represents a single stage in the full cycle and the whole desalination cycle contains M stages. Feed water is provided via input circuit 1431 and pre-heated in the additional heat exchanger 1470. Circuit 1432 transfers the heated feed water from the array of solar collectors 1410 to the evaporator 1421 of the Pt stage HTEU (the leftmost HTEU in FIG. 14). The evaporated moisture is then carried by the carrier gas (air) using circuit 1441 to the condenser 1422, where it is extracted and added to the flow of fresh water in circuit 1451. The fresh water circuit 1451 is a partially closed circuit, so that it has to be filled before the system 1400 can start operation. The cycle of evaporation, condensing and reheating is repeated M−1 times, after which the used feed water is discharged as brine using circuit 1433. During the operation of system 1400, the feed water is transferred from the $1^{st}$ stage to the $2^{nd}$ stage and so on until it is expressed from the heat exchanger 1423 of the last (Mth) stage. At the same time the fresh water flow is in the opposite direction: it flows from the M-th stage to M−1 stage and so on until it is expressed from the condenser of the $1^{st}$ stage. After that most of the fresh water is returned to the M-th stage (i.e. to the input of the heat exchanger of the M-th stage), and the excess fresh water is extracted using a splitter circuit 1452.

In accordance with the present invention, apparatus for mass exchange units, i.e. an evaporator and a condenser, are provided. The design of the evaporator and the condenser are essentially the same; the primary difference between them is in their mode of operation. To facilitate the rate of mass exchange a direct contact between a liquid and a carrier gas is necessary. In this instance the liquid is water (either feed water or fresh water) and the carrier gas is typically air. Several approaches are possible in the design of direct contact evaporators and condensers.

Figure 15:
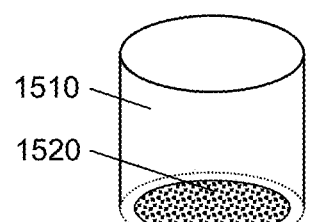
FIGS. 15-17 show examples of a mass transfer unit.
Figure 16:
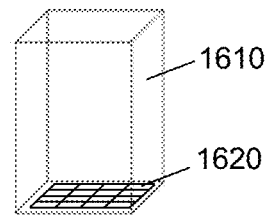

FIG. 15 shows a mass transfer unit 1500 based on the aeration approach. Unit 1500 comprises primarily a vessel 1510 and an aerator 1520. The vessel contains flowing heated water, whereas the aerator provides a steady stream of air bubbles. The aerator 1520 is a disk-shaped aerator having an array of small holes evenly distributed across the top surface of the aerator. The size of air bubbles, as determined by the size of the aerator holes, is preferably in the range of 0.1-5 mm, and more preferably in the range of 0.5-2 mm. The small size of air bubbles ensures a large contact area between water and air, a moderate ascent velocity and a high mass transfer (evaporation or condensation) rate. Unlike the cylindrical unit 1500, the mass transfer unit 1600 shown in FIG. 16 is rectangular. Unit 1600 also comprises a vessel 1610 and an aerator 1620. In this case the aerator 1620 can be made using an interconnected grid of perforated pipes.

Figure 17:
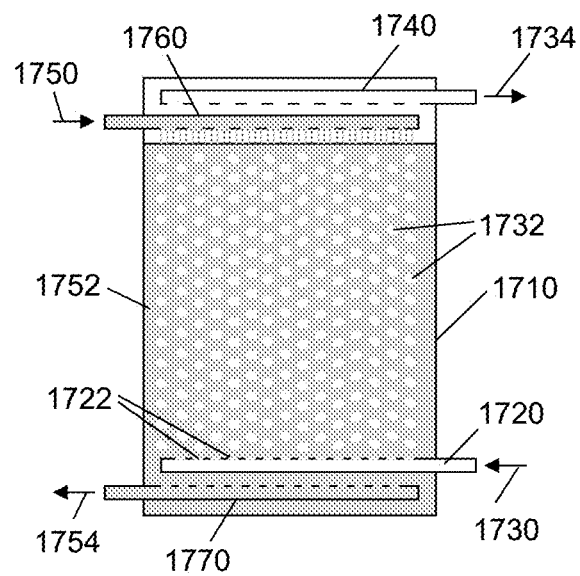

FIG. 17 illustrates the operation of an aeration-based evaporator/condenser. At the bottom of a vessel 1710 there is an aerator 1720, which comprises an array of holes 1722.

An air flow 1730 is provided to the aerator 1720 to produce air bubbles 1732. After propagating through the vessel 1710, the air is collected at the top by an air collector 1740. Water flow 1750 is provided at the top of the vessel 1710 and sprayed using a sprayer 1760. Provided water forms a liquid column 1752 that moves vertically from the top of the vessel 1710 to its bottom, where it is collected by a water collector 1770. The input water flow 1750 has temperature $T_{in}$, whereas the output water flow 1754 has temperature $T_{out}$. The water mass flow rate through the vessel 1710 is M, whereas the dry air mass flow rate is m. The humidity ratios (ratios of vapor mass to dry air mass) of the input and output air flows 1730 and 1734 are $h_{in}$ and $h_{out}$, respectively. If the mass transfer rate is much smaller than the water flow rate ($M_{out} \sim M_{in} = M$), the mass exchange equation may be written as follows:

$$M \cdot C_p \cdot (T_{in} - T_{out}) = m \cdot \lambda \cdot (h_{out} - h_{in}), \quad (1)$$

where $c_p$ is the constant pressure heat capacity and $\lambda$ is the specific latent heat for vaporization/condensation.

Figure 18:
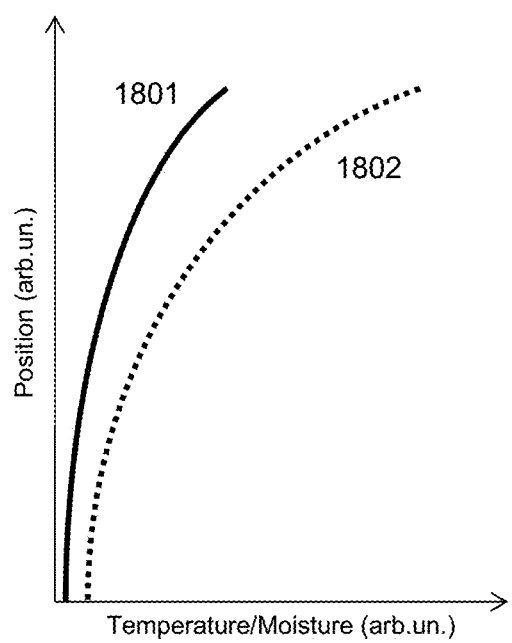
FIG. 18 is a graph illustrating the temperature profile and the moisture content distribution of the bubbles for the mass transfer unit shown in FIG. 17.

This apparatus may function either as an evaporator or as a condenser. The conditions for evaporation are as follows: $T_{in} > T_{out}$, and $h_{in} < h_{out}$. On the other hand, the conditions for condensation are the opposite: $T_{in} < T_{out}$, and $h_{in} > h_{out}$. Also, for evaporation the feed water is used, whereas for condensation the fresh water is used. The small size of air bubbles leads to a moderate rise velocity of the bubbles and a short molecular diffusion time across the bubble's volume. As a result, the vapor pressure and thus the humidity ratio inside a bubble at any given position in the water column are determined primarily by the water temperature at this position. The humidity ratio generally increases with temperature, so that in the evaporator the bubbles increase their moisture content as they rise towards warmer water layers at the top. On the contrary, in the condenser the bubbles lose their moisture as they move from warmer layers at the bottom into the colder layers at the top of the condenser. FIG. 18 illustrates the temperature profile and bubbles' moisture content distribution for the evaporation, where trace 1801 represents the temperature distribution and trace 1802 represents the moisture content in the air bubbles at different positions across the water column.

Figure 19:
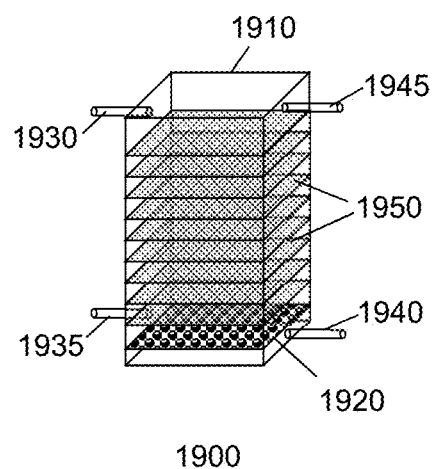
FIGS. 19-27 show other examples of a mass transfer unit.
Figure 20:
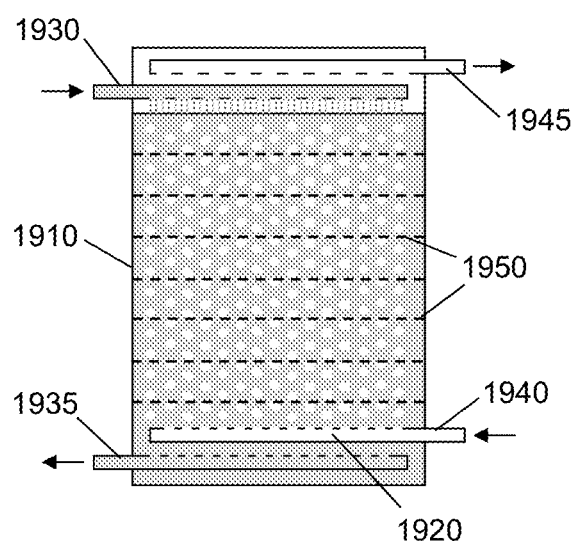

In the aeration-based mass exchange unit, the volume of air bubbles does not remain constant. For example, in an evaporator the bubbles grow in size, as they ascend the water column, due to the addition of water vapor. This effect may increase the size of the bubbles beyond the optimum size, where they are too large and ineffective for evaporation purposes. To prevent this, the evaporator may comprise additional elements and features shown in FIG. 19. Evaporator 1900 includes a vessel 1910, an aerator 1920, and a stack mesh screens 1950. An inlet 1930 and an outlet 1935 are used to provide the vertical flow of water across the vessel 1910. An inlet 1940 and outlet 1945 are used to provide the air flow through the aerator 1920 and the water-filled vessel 1910. The air bubbles propagate through the water, accumulate evaporating vapor and, as a result, grow in their size. The mesh screens 1950 comprise small holes, so that the growing bubbles may subdivide into smaller size bubbles after crossing the screens as shown in FIG. 20. The vertical distance between the mesh screens may be constant as shown in FIG. 20. Alternatively, the screen separation may vary according with their vertical position in the vessel: it may be preferred to have smaller screen separation at the top of the evaporator, where the water temperature and therefore the bubble growth rate are higher.

In a condenser, on the other hand, the volume and size of the bubbles decrease during their ascent, as the vapor is reabsorbed into the liquid. This decrease in size may be less of a problem, as compared to the scenario described above for the evaporator. Under appropriate conditions, the size of the bubble may become so small that under the Laplace pressure the bubble may completely dissolve in water. However, it may be also preferable in some cases to maintain the same average bubble size across the condenser vessel. In this case the apparatus shown in FIGS. 19 and 20 may perform a similar function: the mesh screens in this case can accumulate small size bubble and aggregate them into larger size bubbles. In both scenarios, i.e. evaporation and condensation, the mesh screens stabilize the flow of air bubbles and minimize turbulence. Turbulence and resulting heat convection in the water column may alter its temperature profile, which in turn lowers the evaporation (or condensation) rate.

Figure 21:
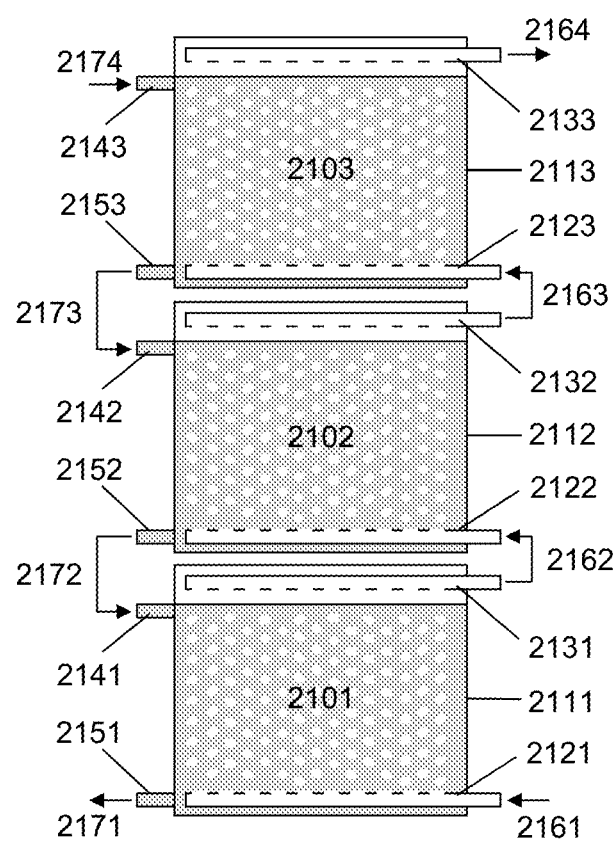

The efficiency of an aeration-based mass exchange unit could be improved by using an approach illustrated in FIG. 21. Unit 2100 comprises several smaller mass exchange units or subunits 2101, 2102 and 2103. Although in this example only three subunits units are shown, of course any other number of such subunits can be combined to produce similar systems. Each subunit (2101, 2102 and 2103) comprises a vessel (2111, 2112 and 2113, respectively), an aerator (2121, 2122 and 2123, respectively), an air collector (2131, 2132 and 2133, respectively), a water inlet (2141, 2142 and 2143, respectively) and a water outlet (2151, 2152 and 2153, respectively). The operation of each subunit is similar to that described in FIG. 17. The multi-vessel mass exchange unit 2100 improves the mass exchange efficiency by providing a better temperature control of the water flow. For example, it prevents heat convection and diffusion between different subunits. The air 2161 is first provided to the lowest subunit 2101. Then processed air flow 2162 is circulated to the next subunit 2102, after which processed air flow 2163 is transferred to the subunit 2103 and exhausted as airflow 2164. Meanwhile the water flow 2174 is first provided to the top subunit 2103, from which the used water flow is transferred to the next subunit 2102 and then to the subunit 2101, where it is exhausted as flow 2171. When the unit 2100 is operated as an evaporator, the water temperature is gradually decreasing from top to bottom, so that the average water temperature in the top subunit 2103 is higher than that in the middle subunit 2102, which in turn is higher than the temperature in the bottom subunit 2101. Respectively, the moisture content in the air flow is increasing going from the bottom up to the top, so that the moisture content of the air flow 2164 at the outlet of subunit 2103 is higher than that of the air flow 2163 from the subunit 2102, which in turn is higher than the moisture content of the air flow 2162 from the subunit 2101. When the unit 2100 is operated as a condenser, the water temperature is gradually increasing going from the top to the bottom and the moisture content of the air flow is decreasing as it goes up from the bottom to the top. Subunits 2101, 2102 and 2103 may be physically stacked on top of each other, in which case the water inlets and outlets of the neighboring units may be directly interconnected, providing a natural water flow under the force of gravity. However, they may be also positioned side by side or in any other configuration. In this case the water and air flows between different subunits may be driven by additional pumps.

Figure 22:
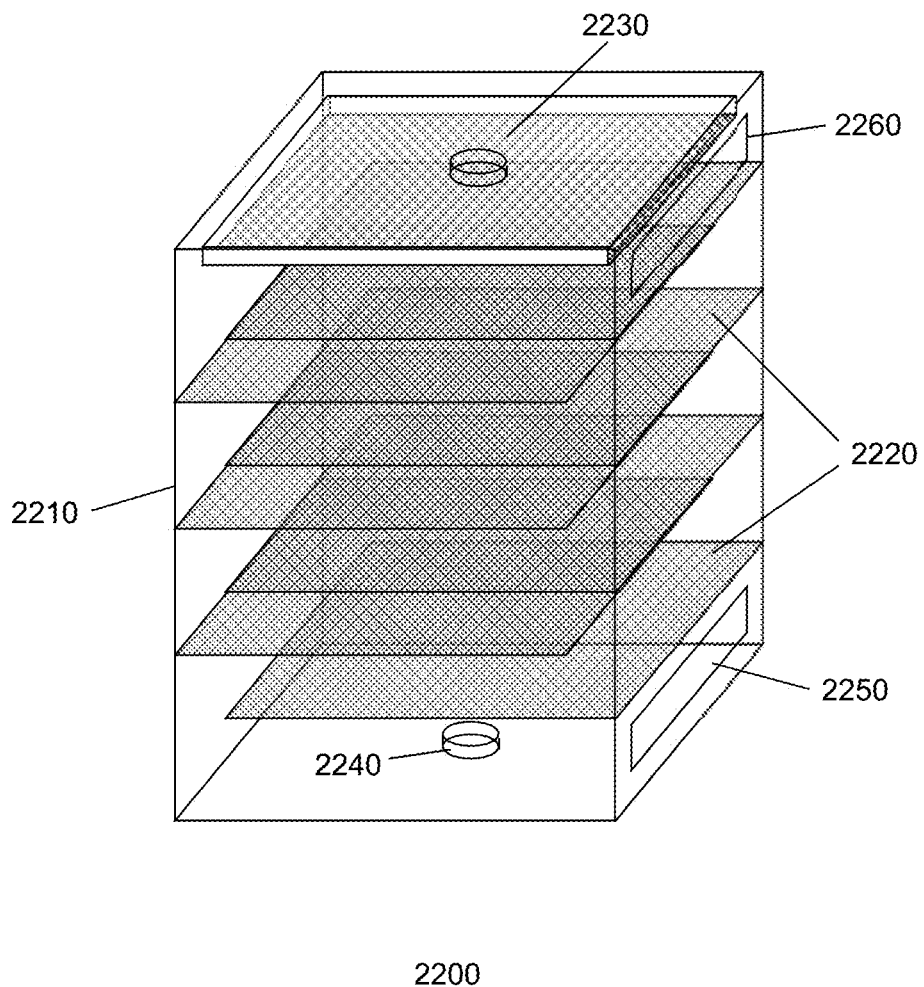

In accordance with the present invention, another approach may be used to provide direct contact evaporation and condensation. FIG. 22 shows a mass exchange unit 2200 comprising a vessel 2210, a stack of screens 2220 and a water dispenser 2230. The operation of the unit 2200 is in many respects very similar to the aeration-based mass exchange unit described above. The water is delivered into the vessel and sprayed evenly on top of the screen stack. The screens comprise arrays of small holes, which allow the water to accumulate in small amounts on the screens and then slowly drip down before finally reaching the bottom of the vessel. At the bottom a water outlet 2240 is provided for removing used water. At the same time air is pumped into the air inlet 2250. The air flow is then directed to pass between the wet screens in close and direct contact with the flowing water, after which it is discharged through the air outlet 2260.

Figure 23:
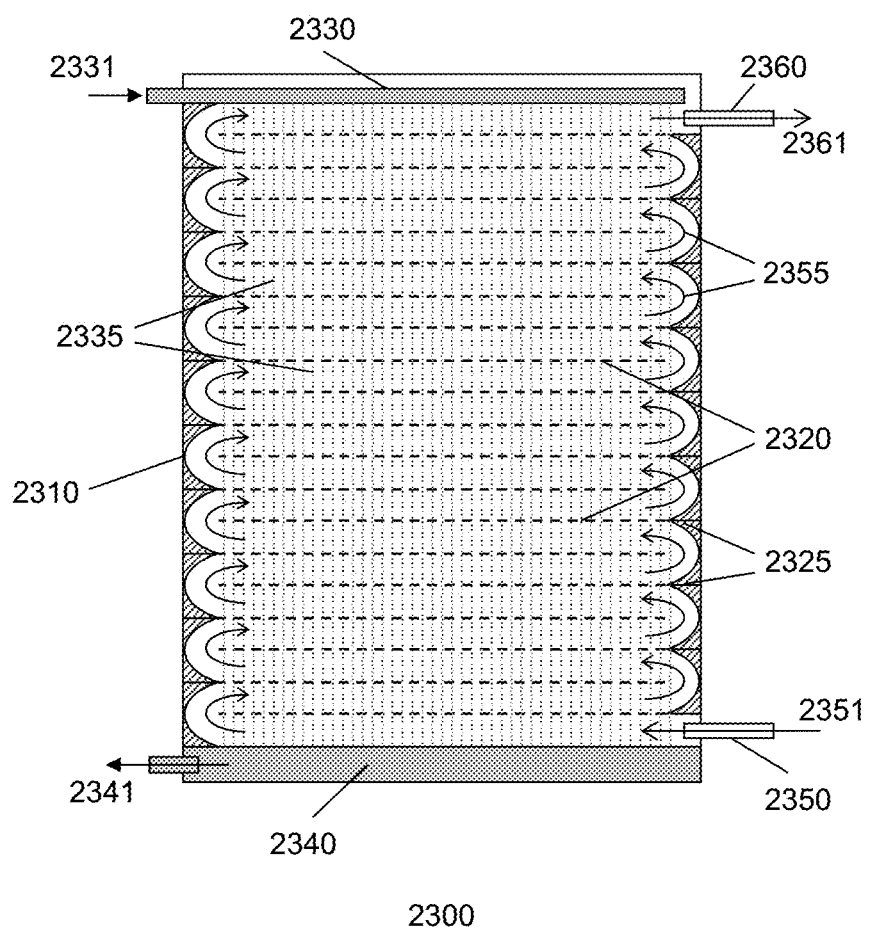

FIG. 23 shows a cross-section of a mass exchange unit 2300 and further illustrates its operation, which is based on an air flow over a wetted screen. Unit 2300 comprises a vessel 2310, a stack of screens 2320, a water sprayer 2330, a water collector 2340, an air inlet 2350 and an air outlet 2360. Incoming water 2331 is first sprayed evenly across the topmost screen 2320, after which it starts to slowly drip from screen to screen thus forming an artificial "rainforest" shower 2335. Subsequently, the water is collected in the water collector 2340 at the bottom of the unit and discharged as the outgoing water flow 2341. The input air flow 2351 is provided via the air inlet 2350. The screens 2320 may be staggered as shown in FIG. 23, so that the air in the vessel may flow between the screens in a zigzag path indicated by the arrows 2355. Although some of the air may pass through the screens' openings that are not closed by the falling water drops, most of the air goes around the screens following the path that is most efficient for mass exchange between the downward water flow and the upward air flow. The air flow may be stabilized and directed by additional baffles 2325. As a result, a large direct contact area may be produced between the falling water and the air flow, leading to a high mass transfer rate. Finally, the air outlet 2360 is used to produce the output air flow 2361.

The mass exchange unit 2300 may be operated as an evaporator. In this case the incoming water flow 2331 is heated and the temperature of water droplets 2335 gradually decreases as they descend to the bottom of the vessel. The temperature decrease is primarily due to the water evaporation facilitated by the air flow 2355. The vapor is picked up the air, so that the moisture content in the air flow increases, as it ascends the screen stack. Alternatively, the mass exchange unit 2300 may be operated as a condenser. In this case the incoming water flow 2331 is cooled and the temperature of water droplets 2335 gradually increases, as they descend to the bottom of the vessel. The temperature increase is primarily due to the water condensation and the associated release of latent heat. The moisture in this case is supplied with the air flow 2355, so that the moisture content in the air flow decreases, as it ascends the screen stack.

The screens 2320 may be produced in a number of ways from a variety of materials, including metals, plastics, glasses and ceramics. Screens may be made for example by producing holes in a thin sheet of an appropriate material or by forming a wire mesh from thin wires or fibers. Screens may be also made from porous or sponge-like sheets, having a continuous and interconnected network of pores to allow water penetration. It may be preferred to produce screens using a low-cost net or mesh made of metal wires or plastic fibers. Plastic meshes may be also formed into their final form directly from the melt using preforms. Appropriate metals for mesh materials include stainless steel, aluminum, copper and others. There is a wide variety of plastic materials appropriate for use as screens, which includes polyethylene terephthalate (PET), polyethylene, polyvinyl chloride (PVC) and many others.

Figure 24:
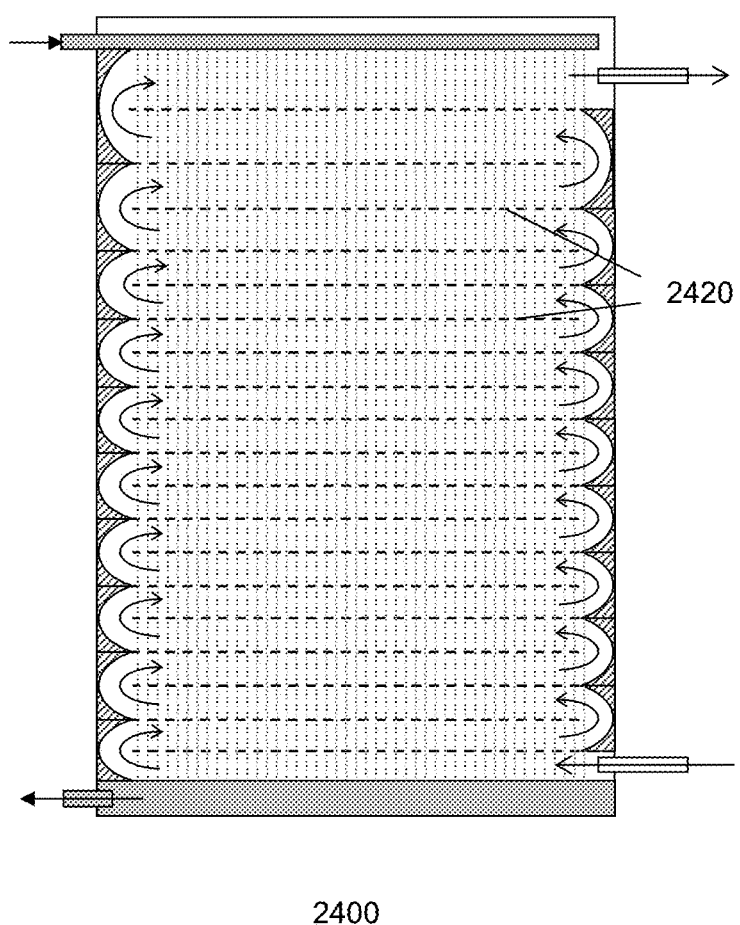

The screens may be flat and stacked horizontally on top of each other having a constant vertical separation as shown in FIG. 23. However, it may be preferred to having a varying separation between neighboring screens as shown in FIG. 24. A wetted screen evaporator 2400 is similar to the unit 2300, except the screens 2420 are more widely spaced at the top of the evaporator as compared to those at the bottom. As the air flow in the evaporator ascends and collects moisture from the falling water, its volume and respective flow rate increase. The increase in the flow rate at the top of the evaporator may lead to excessive air flow velocity. This process however can be controlled and minimized by increasing the separation between the screens, thereby reducing the evaporation rate and at the same slowing down air flow. The same approach may be used in a condenser, in which case the screen separation should be decreasing going from the bottom of the condenser to the top.

Figure 25:
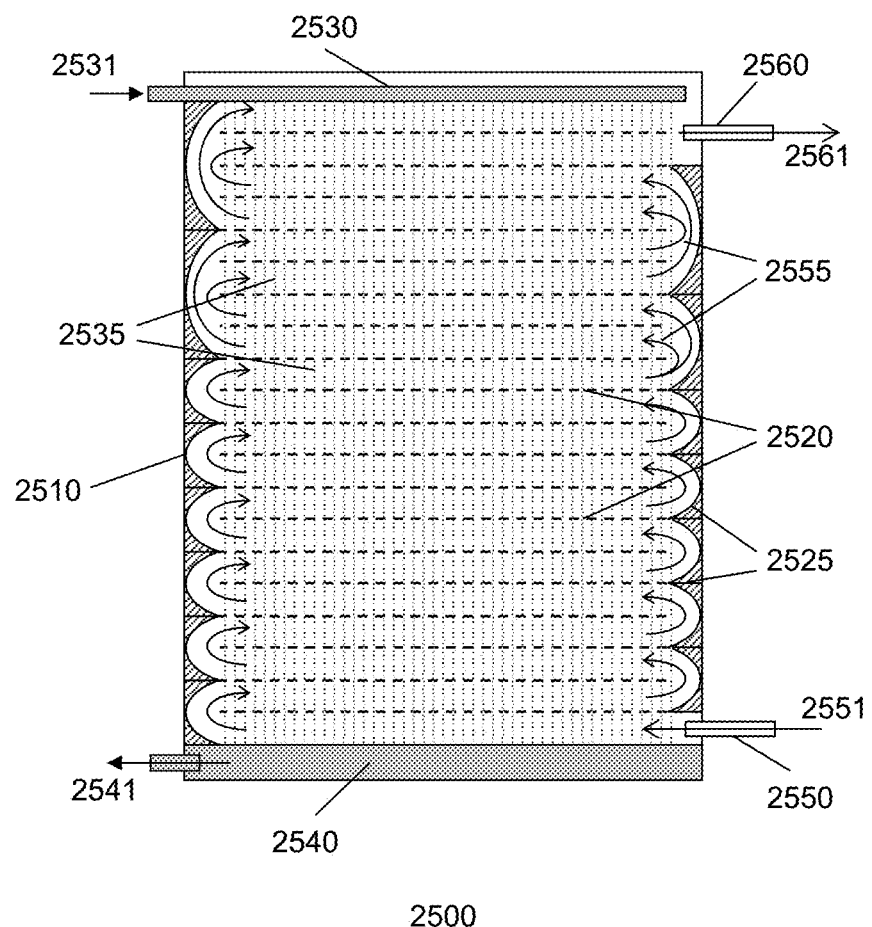

Alternatively, the screens may be arranged as shown in FIG. 25. An evaporator 2500 comprises the same basic elements as the other mass exchange units described above, including a stack of screens 2520. In this case the separation between the screens may be constant across the full extent of the vessel 2510, as shown in FIG. 25. However, it may also vary depending on the position of the screen in the stack, as discussed above. In addition, the screens 2520 may be arranged and staggered as shown in FIG. 25, in order to produce additional air passages, reduce air flow speed and improve efficiency. For this purpose, baffles 2525 have been modified accordingly, gradually increasing in size from the smallest baffle at the bottom to the largest one at the top of the evaporator. Of course, a similar approach can be implemented for the condenser, in which case the baffle size should be decreasing going from the bottom to the top of the condenser.

Figure 26:
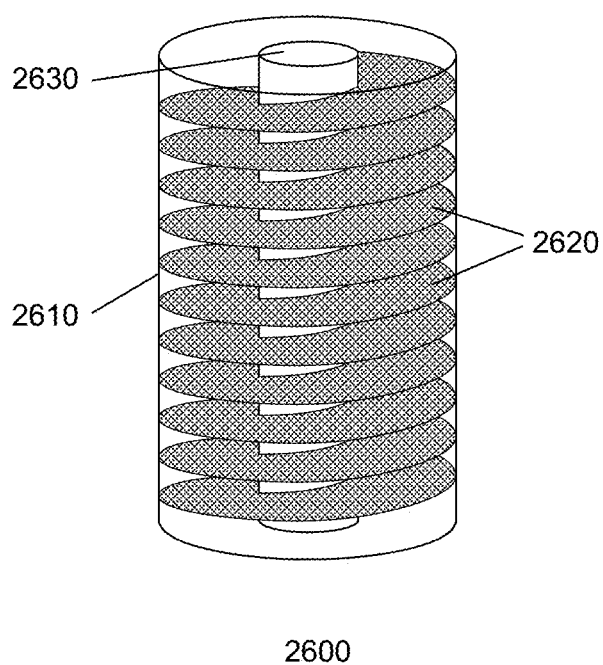

Although the above discussion focused primarily on boxed or rectangular units, other geometries or mechanical layouts are possible for the construction of a mass-exchange unit based on a wetted screen approach. These geometries include vessels and containers having either constant cross-sectional area and shape across its height, e.g. a cylinder, or varying cross-sectional area and shape, e.g. a cone. For example, FIG. 26 shows a cylindrical mass-exchange unit 2600, which comprises a cylindrical vessel 2610 and a spiral screen 2620. Unlike the previously described designs, the screens in the unit 2600 may be produced as a single piece, e.g. from a rolled mesh. In addition, the unit 2600 may also comprise the hollow core 2630, providing a convenient place for additional components of a system, such as piping, pumps, controllers and other electrical parts.

Figure 27:
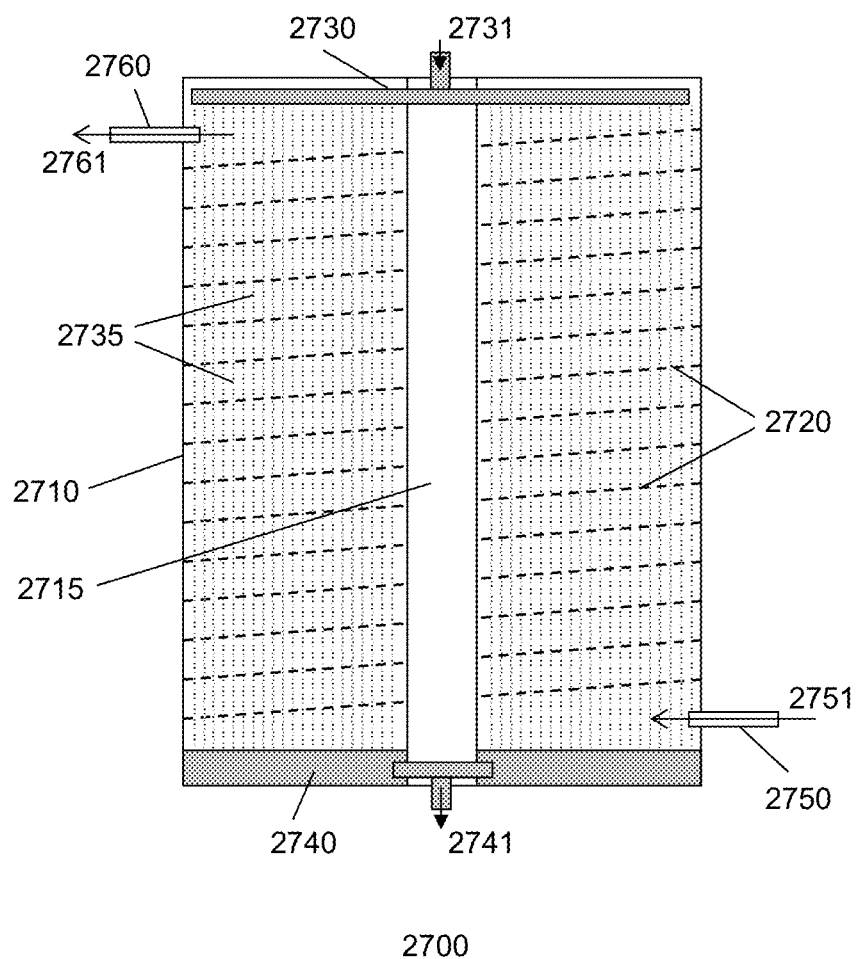

FIG. 27 shows a cross-section of a cylindrical mass-exchange unit 2700. The water dispenser 2730 is used to spray the incoming water flow 2731 onto the screens 2720. As the water drips, it forms a falling water shower 2735 until it reaches the bottom of the vessel 2710, where it is collected by the water collector 2740 and discharged into the water flow 2741. At the same time the air inlet 2750 provides an air flow 2751. The air may travel between the screens along the spiral passage formed by the spiral screen stack. In the unit 2700 illustrated in FIG. 27 the air flow in the right-hand side of the vessel is directed away from the viewer, whereas the air flow in the left-hand side of the vessel is directed towards the viewer. The air is moving upwards along the screens, which provide a large contact area with the dripping water. At the top of the vessel the air 2761 is exhausted using the air outlet 2760.

Of course other geometrical and mechanical configurations may be suitable in the described approaches. Also, any combination of the approaches, methods, solutions and specific implementations discussed above may be used in the same desalination system. This invention provides methods and apparatus to solar desalination, which is more efficient, scalable and less expensive than the existing approaches. The efficiency of the desalination system is enhanced by the use of a fresh water recirculation loop and additional heat exchangers, which respectively increase the humidification/dehumidification rate and recover residual heat. This system is modular and highly scalable, so that the same design can be implemented in different plant sizes having vastly different capacities. A large system may be composed of smaller units or modules that each can function as an independent desalination plant. This is in part made possible by the use of integrated PV modules that provide local electrical power and enable an autonomous operation. The system is also intrinsically inexpensive, as it is made of standard parts that can be mass-produced in large quantities and most of them can be made cheaply from low-cost plastic materials. It is expected that the desalination system provided by this invention can be ten times more efficient than the existing solar stills.

Example 1

In accordance with the present invention, an apparatus for aeration-assisted mass exchange, e.g. evaporation and condensation, can be provided. It includes a cylindrical container and a disk shaped aerator as shown in FIG. 15. The container can be produced from stainless steel, PVC or other container material suitable for processing of potable water. The diameter of a container may be in the range of 1 cm to 1 m, preferably in the range of 10 to 20 cm, whereas the height of the container may be in the range of 2 cm to 2 m, preferably in the range of 10 to 40 cm. The diameter of the aerator may be about the diameter of the container. The aerator may have a dense array of holes having a diameter in the range of 0.1 to 5 mm, preferably 0.5-2 mm, and the spacing between nearest holes in the range of 0.1 to 5 mm. The apparatus may also include a stack of screens that are made of a stainless steel wire mesh or plastic fibers. Screens may be less than 1 mm thick, preferably less than 0.5 mm thick. Screens may includes holes and openings with average size of about 0.1-2 mm, preferably 0.5-1 mm. Screens are stacked on top of each other with vertical spacing of about 2 to 30 cm, preferably of about 5 to 10 cm. The screens are sized to provide a neat fit to the inside of the container, so that each has a circular area with a diameter close to the diameter of a container.

The mass-exchange apparatus may further include an air pump for providing an air flow to the aerator. The air flow rate depends on the overall capacity of the system and the amount of absorbed sunlight at any given moment. For a small system having a solar heat collector with an active absorber area of about 1-2 m², the air flow rate may be vary between 0 to 100 liters/min. The apparatus may also include a water pump for providing a vertical laminar water flow from the top of the container to its bottom at variable flow rate of 0 to 1 liter/min.

The apparatus may be operated as either an evaporator or a condenser. For evaporation, the feed water is provided and preheated to a temperature above the ambient temperature. The heated feed water temperature $T_{in}$ may be in the range of 50° C. to 100° C., preferably in the range of 80° C. to 99° C. As the feed water flows through the container from the top to the bottom, the dry air is provided and fed through the aerator at the bottom of the container. As the air bubbles rise to the top of the container, they are saturated with water vapor. The moisture content of the air at the air outlet of this evaporator is primarily determined by the water temperature at the top of the container, so that $h_{out}>0.1$ for $T_{in}>50°$ C. and $h_{out}>0.6$ for $T_{in}>80°$ C. For condensation, the cooled fresh water is provided at the top and humid heated air is fed from the bottom. After passing through the water, the air is dehumidified, so that its output humidity content is primarily determined by the input water temperature. The output air humidity ratio is less than 0.1 for $T_{in}<50°$ C.

Example 2

In accordance with the present invention, an apparatus for wetscreen-assisted mass exchange, e.g. evaporation and condensation, can be provided. It includes a container and a stack of see-through screens as shown in FIG. 22. The container can be produced from stainless steel, PVC or other container material suitable for processing of potable water. The container may be square in the cross-section having a side size in the range of 1 cm to 1 m, preferably in the range of 10 to 20 cm, whereas the height of the container may be in the range of 2 cm to 2 m, preferably in the range of 10 to 40 cm. The size of the screens may be about the size of the container. The screens may be staggered to provide a passage for the air flow between them, so that some of them have a wide opening for air passage on the right side, while others have an opening on the left side. They may be made of a stainless steel wire mesh, plastic fibers, thin sponge or perforated sheets of other water-safe materials. Screens may be less than 1 mm thick, preferably less than 0.5 mm thick. Screens include holes and openings with average size of about 0.01-2 mm, preferably 0.1-0.5 mm. Screens are stacked on top of each other with vertical spacing of about 0.2 to 10 cm, preferably of about 0.5 to 2 cm.

The mass-exchange apparatus may further include an air pump for providing an air flow through the container. The air flow rate depends on the overall capacity of the system and the amount of absorbed sunlight at any given moment. For a small system having a solar heat collector with an active absorber area of about 1-2 m², the air flow rate may be vary between 0 to 100 liters/min. The apparatus may also include a water pump for providing a water flow from the top of the container to its bottom at variable flow rate of 0 to 1 liter/min.

The apparatus may be operated as either an evaporator or a condenser. For evaporation, the feed water is provided and preheated to a temperature above the ambient temperature. The heated feed water temperature $T_{in}$ may be in the range of 50° C. to 100° C., preferably in the range of 80° C. to 99° C. As the feed water flows through the container and the screen stack from the top to the bottom, the air is provided at the bottom and fed through the container. As the air rises to the top of the container, it is saturated with water vapor. The moisture content of the air at the air outlet of this evaporator is primarily determined by the water droplet temperature at the top of the container, so that $h_{out}>0.1$ for $T_{in}>50°$ C. and $h_{out}>0.6$ for $T_{in}>80°$ C. For condensation, the cooled fresh water is provided at the top and humid heated air is fed from the bottom. After passing through the wet screens, the air is dehumidified, so that its output humidity content is primarily determined by the input water temperature. The output air humidity ratio is less than 0.1 for $T_{in}<50°$ C.

Example 3

In accordance with the present invention, an HTS apparatus of a desalination system may be provided as shown in FIG. 9. The apparatus comprises a solar heat collector, an evaporator, a condenser and a heat exchanger. Feed water is provided to the apparatus from a salt or brackish water source, e.g. an ocean or a pond. This water is preheated using a counter-current heat exchanger, e.g. a shell-and-tube heat exchanger produced by Exergy LLC, and then further heated using a solar heat collector, e.g. an FPC panel produced by Schuco USA having an absorber area in the range of 2-3 m². Multiple collector panels may be used in a single HTS and also, other types of heat collector may be used instead of FPC panels, such as evacuated tubes or concentrated solar collectors. The heated feed water is then fed to the evaporator at a temperature $T_{in}$ in the range of 50° C. to 100° C., preferably in the range of 80° C. to 99° C. The evaporator may be provided using the apparatus described either in example 1 or 2 above. Used feed water coming out of the evaporator may be discharged from the system as brine. The humidified air from the evaporator is transferred to the condenser that may be provided using the apparatus described either in the example 1 or 2 above. The dehumidified air may be then recirculated back to the evaporator. The condensed fresh water, on the other hand, is transferred to the heat exchanger and used to preheat the feed water. Fresh water temperature after the heat exchanger is close to the temperature of input feed water, in the range of 4-50° C. The excess fresh water may be removed and discharged from the system. The remaining cooled fresh water is then fed back to the condenser in a closed loop configuration. In addition, a second heat exchanger may be used to further pre-heat the incoming feed water by using residual heat in the discharged brine, as shown in FIG. 10

Example 4

In accordance with the present invention, a desalination system powered exclusively by solar energy is provided as shown in FIG. 1. The system's electrical power is produced by an integrated PV module, e.g. a BP Solar 380J panel. The HTS apparatus may be produced using the approach described in example 3. The water and air pumps that transfer air and water inside the system's circuits are powered by the PV module. The system controller adjusts the flow rates of the air and water flows, in order to maintain optimum operating conditions that in turn depend on the amount of absorbed sunlight energy. The set of optimum conditions includes the maximum feed water temperature, which primarily determines the evaporation rate. In low sunlight the flow rate is maintained at relatively low levels, whereas in bright sunlight the flow rate can be increased up to its maximum value as determined by the overall system capacity. The typical production rate of such a system is about 20-40 L/m²/day; for a desalination system with a 2 m² solar collector this translates into 40-80 L/day. This in turn requires a water flow rate of about 0.1-1 L/m²/day; for a desalination system with a 2 m² solar collector this translates into 0.2-2 L/day.

Figure 28:
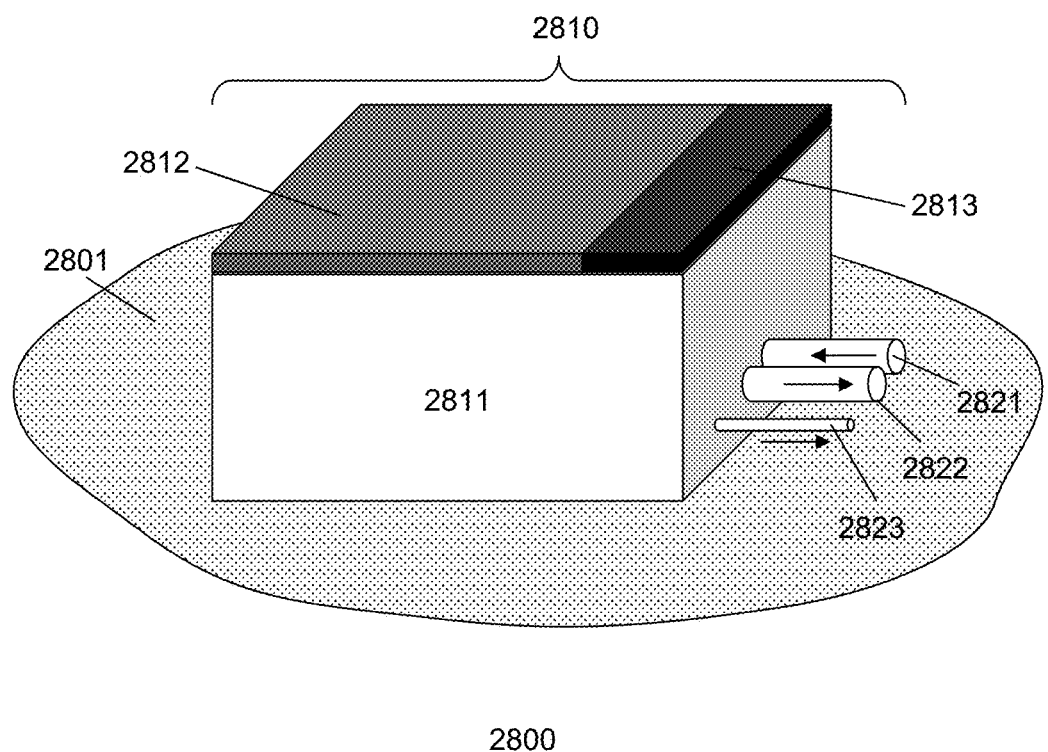
FIG. 28 shows an example of a desalination system that relies exclusively on solar energy.

An example of such a system is shown in FIG. 28. In this case desalination system 2800 is a land-based system, comprising at least one module 2810 located on a ground surface 2801. Module 2810 includes a housing 2811, a solar heat collector 2811 and a PV module 2813. The housing is used to combine all the other components of the system (EMS and HTS components) in one unit. Using the approaches described above, the housing may be made compact and fit under the solar collector and PV panels. In addition, water lines 2821, 2822 and 2823 are provided for supplying the feed water, and discharging the brine and fresh water, respectively.

The system 2800 may be operated solely on solar energy and autonomously from other sources of heat and power. However, such a system may be useful for desalination using alternative sources of energy. For example, the system 2800 may be connected to other electrical power and heat sources that are available when the solar energy is not. This approach allows to use this desalination apparatus even in the absence of sunlight, e.g. at night. As a result, during the day such a system may be operated in the solar-only mode, and during the night the system may be operated using for example the electrical utility grid for the power source and waste heat or externally stored heat for the heat source.

Example 5

Figure 29:
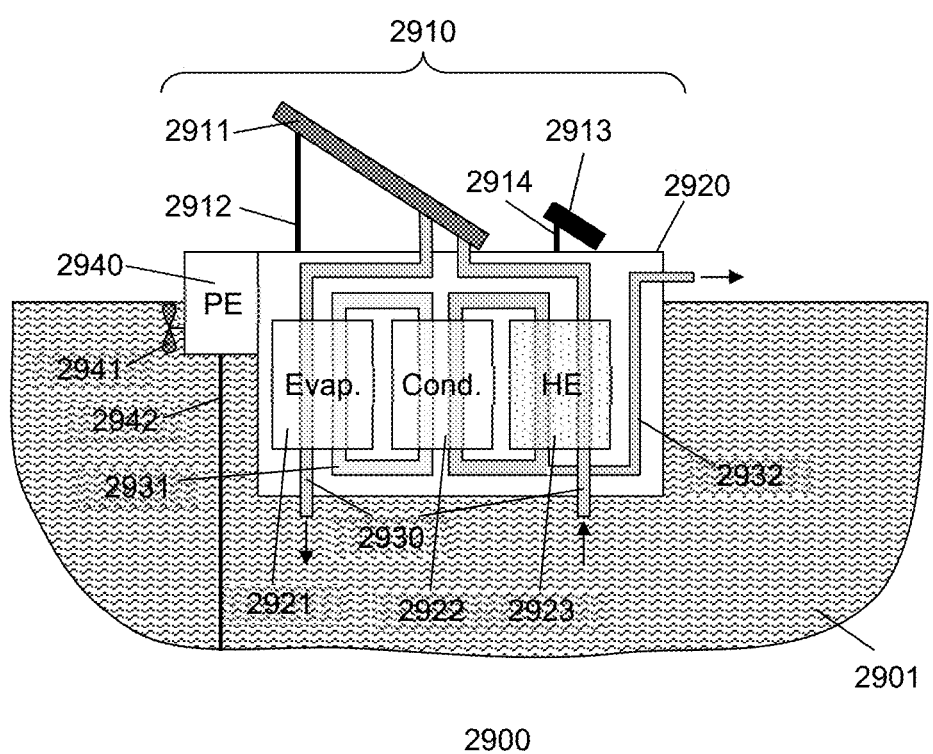
FIG. 29 shows an example of a water-based desalination system.

In accordance with the present invention, a desalination system powered exclusively by solar energy is provided as shown in FIG. 29. Desalination system 2900 is a water-based system; it may be used for example on an ocean (2901). The system includes at least one module 2910, which in turn comprises a solar heat collector 2911, a PV panel 2913 and a vessel or other housing 2920. The housing contains at least an evaporator 2921, a condenser 2922 and a heat exchanger 2923. Furthermore, the housing contains a feed water circuit 2930, a carrier air circuit 2931 and a fresh water circuit 2932. Ocean water in this case is used as the feed water. Desalination system 2900 produces low-salinity brine that can be safely discharged back into the ocean without causing any environmental concerns. For example, in a single-stage system the salinity of the brine with respect to the feed water increases by less than 10%.

In order to improve the collection efficiency of the solar heat and power, the solar energy collector 2911 and the PV panel 2913 can be tilted and positioned in the direction of the sun using positioning equipment 2912 and 2914, respectively. This positioning equipment may provide either a fixed position or a varying position that in turn may actively track the sun's position in the sky. In addition, the desalination system module 2910 may include other positioning equipment 2940 that enables the system 2900 to change its position (e.g., orientation, location) as a whole, for example by moving across the surface of the ocean or by submerging below its surface. For this purpose the positioning equipment 2940 may include a motor 2941 that allows translational motion across the water surface. Also the positioning equipment 2940 may include an anchor 2942 that allows the module to maintain a fixed position on the surface and also submerge underwater to avoid inclement weather.

Desalination system 2900 may include a plurality of modules 2910, which may be arranged and connected to each other to form an array of modules 2910. These modules may be operated and controlled in unison to provide fresh water into the same water storage facility.

The invention claimed is:
1. An evaporator/condenser, comprising:
at least one mass exchange unit, each of the mass exchange unit including:

a vessel for containing gas and water, the vessel having an upper portion and a lower portion;

a gas conduit located in a bottom portion of the vessel and having a gas inlet communicating a gas flow from external of the vessel into the gas conduit;

an aerator receiving gas from the gas conduit and creating a stream of gas bubbles;

a water intake conduit for receiving a flow of water from a source external to the vessel, the water intake conduit being located in an upper portion of the vessel;

a water output conduit located in the lower portion of the vessel through which water flows out of the vessel;

a gas outlet located in the upper portion of the vessel; and a series of mesh screens being arranged in a stack in the vessel between the water intake conduit and the aerator so that, when used as an evaporator, gas bubbles from the aerator rising in the vessel through water are subdivided into smaller gas bubbles as they pass through holes in each of the mesh screens, and when used as a condenser, accumulate small size bubbles from the aerator rising in the vessel through water and aggregate them into larger sized bubbles.

2. The evaporator/condenser of claim 1 further comprising a plurality of mass exchange units, a gas outlet of a first one of the mass exchange units being coupled to the air inlet of the gas conduit of a second one of the mass exchange units and the water output conduit of the second mass exchange unit being coupled to the water intake conduit of the first mass exchange units.

3. The evaporator/condenser of claim 1 wherein the first and second mass exchange units are stacked one upon another such that the second mass exchange unit is located above the first mass exchange unit.

4. The evaporator/condenser of claim 1 the aerator is configured to create gas bubbles having a size between 0.1 mm and 5 mm.

5. The evaporator/condenser of claim 1 the aerator is configured to create gas bubbles having a size between 0.5 mm and 2 mm.

6. The evaporator/condenser of claim 1 wherein a spatial separation between adjacent ones of the mesh screens is constant.

7. The evaporator/condenser of claim 1 wherein a spatial separation between adjacent ones of the mesh screens varies with a vertical position of each of the mesh screens.

8. The evaporator/condenser of claim 7 wherein the spatial separation increases as the vertical positions of the mesh screens become closer to the lower portion of the vessel.

9. The evaporator/condenser of claim 1 further comprising a sprayer for spraying the water from the water intake conduit to create columns of water that move from top to bottom in the vessel.

10. An evaporator/condenser, comprising:

at least one mass exchange unit, each of the mass exchange unit including:

a vessel for containing gas and water, the vessel having an upper portion and a lower portion;

a gas conduit located in a bottom portion of the vessel and having a gas inlet communicating a gas flow from external of the vessel into the gas conduit;

a water intake conduit for receiving a flow of water from a source external to the vessel, the water intake conduit being located in an upper portion of the vessel;

a sprayer for spraying the water from the water intake conduit to create columns of water that move from top to bottom in the vessel;

a water output conduit located in the lower portion of the vessel through which water flows out of the vessel;

a gas outlet located in the upper portion of the vessel; and at least one mesh screen being arranged in a layered stack in the vessel between the water intake conduit and the water output conduit so that a wetted mesh surface can provide a large contact area for mass exchange between gas and water.

11. The evaporator/condenser of claim 10 wherein the sprayer is configured to spray the water across a topmost one of the mesh screens.

12. The evaporator/condenser of claim 10 wherein the at least one mesh screen comprises a series of mesh screens that are laterally staggered such that adjacent ones of the mesh screens are laterally offset with respect to one another so that a path through the vessel is provided along which the gas is able to flow from the air inlet to the air outlet without traversing any holes in the mesh screens.

13. The evaporator/condenser of claim 10 further comprising a series of baffles each being associated with one of the mesh screens to block gas flow between an outer portion of the respective mesh screen and an interior wall of the vessel such that gas flow is facilitated along said path through the vessel.

14. The evaporator/condenser of claim 10 wherein at least one mesh screen comprises a series of mesh screens and a spatial separation between adjacent ones of the mesh screens varies with a vertical position of each of the mesh screens.

15. The evaporator/condenser of claim 13 wherein the baffles are constant in size.

16. The evaporator/condenser of claim 13 wherein a size of each baffle varies with vertical position.

17. The evaporator/condenser of claim 10 wherein the vessel has a constant cross-sectional area.

18. The evaporator/condenser of claim 10 wherein the vessel has a varying cross-sectional area across its height.

19. The evaporator/condenser of claim 10 wherein the vessel is cylindrical in shape.

20. The evaporator/condenser of claim 19 wherein the at least one mesh screen comprises a series of mesh screens that are defined by a continuous spiral mesh screen.

21. The evaporator/condenser of claim 20 wherein the vessel includes a hollow core in which the mesh screens are not present.

22. The evaporator/condenser of claim 10 further comprising an aerator receiving gas from the gas conduit and creating a stream of gas bubbles in water.

* * * * *